United States Patent [19]

Palmer

[11] Patent Number: 5,304,286
[45] Date of Patent: Apr. 19, 1994

[54] WATER SUPPLY SYSTEM

[76] Inventor: David G. Palmer, 3334 Woodsshire Pkwy., Lincoln, Nebr. 68502

[21] Appl. No.: 430,236

[22] Filed: Nov. 1, 1989

Related U.S. Application Data

[62] Division of Ser. No. 30,359, Mar. 26, 1987, Pat. No. 4,906,337.

[51] Int. Cl.$^5$ .................. B01D 3/02; B01D 3/42; C02F 1/04
[52] U.S. Cl. .................. 202/167; 165/110; 202/185.1; 202/160; 202/206; 203/1; 203/2; 203/10; 203/27; 219/490; 219/523; 219/536; 392/326; 392/498; 392/501
[58] Field of Search .................. 203/10, 1, 2, DIG. 18, 203/DIG. 8, 21, 27; 202/167, 176, 185.1, 206, 160, 166; 219/490, 523, 536; 392/344, 406, 398, 453, 326, 501, 498; 165/110

[56] References Cited

U.S. PATENT DOCUMENTS

| | | | |
|---|---|---|---|
| 398,263 | 2/1889 | Kirkaldy | 202/167 |
| 849,210 | 4/1907 | Daley et al. | 202/166 |
| 971,668 | 10/1910 | Lany | 202/167 |
| 1,116,804 | 11/1914 | Daley | 202/166 |
| 1,268,233 | 6/1918 | Furman | 202/174 |
| 1,799,951 | 4/1931 | Bros et al. | 219/318 |
| 1,902,842 | 3/1933 | Eaton | 219/287 |
| 2,427,150 | 9/1947 | McCann | 219/312 |
| 2,485,999 | 10/1949 | Birchler et al. | 219/287 |
| 2,533,615 | 12/1950 | Osterheld | 219/318 |
| 3,055,810 | 9/1962 | Skow | 203/10 |
| 3,269,919 | 8/1966 | Baily et al. | 202/206 |
| 3,446,940 | 5/1969 | Morgan | 219/318 |
| 3,687,817 | 8/1972 | Jimerson et al. | 202/206 |
| 3,696,003 | 10/1972 | Fitch et al. | 203/4 |
| 3,736,234 | 5/1973 | Miyamoto | 159/DIG. 31 |
| 3,778,592 | 12/1973 | Williams | 219/318 |
| 3,825,491 | 7/1974 | Sanchez | 202/176 |
| 3,860,494 | 1/1975 | Hickman | 202/167 |
| 4,045,293 | 8/1977 | Cooksley | 202/202 |
| 4,107,511 | 8/1978 | Shulz et al. | 219/273 |
| 4,110,170 | 8/1978 | Kirschman et al. | 219/287 |
| 4,252,616 | 2/1981 | Glazer | 202/176 |
| 4,261,796 | 4/1981 | Lemoine | 202/176 |
| 4,265,712 | 5/1981 | McLean | 202/166 |
| 4,339,307 | 7/1982 | Ellis, Jr. | 202/181 |
| 4,343,987 | 8/1982 | Schimbke et al. | 219/287 |
| 4,394,562 | 7/1983 | Epstein et al. | 219/318 |
| 4,444,623 | 4/1984 | Youngner | 202/181 |
| 4,549,936 | 10/1985 | Erickson | 202/167 |
| 4,578,565 | 3/1986 | Dawidowitch | 219/314 |
| 4,601,789 | 7/1986 | Bjorklund | 202/167 |
| 4,679,529 | 7/1987 | Mancel | 165/110 |
| 4,687,550 | 8/1987 | Wong | 203/10 |
| 4,730,099 | 3/1988 | Bleckman | 219/318 |
| 4,757,182 | 7/1988 | Albright | 219/316 |
| 4,777,347 | 10/1988 | Mottershead | 219/316 |
| 4,808,794 | 2/1989 | Foreman et al. | 219/318 |

Primary Examiner—Virginia Manoharan
Attorney, Agent, or Firm—Price, Heneveld, Cooper, DeWitt & Litton

[57] ABSTRACT

To provide a balanced supply of distilled water and undistilled hot water for a household, a condenser coil communicates at one end with a steam generator located above a hot water heater and at its other end well the holding tank of a distilled water system, with a condenser entering the hot water heater near the bottom. The steam generator power input matches the power needed to meet the recovery rate to satisfy undistilled hot water demand under normal conditions. The condenser includes a plurality of loops grouped together so a line drawn from top to bottom through them is no longer than 5 inches. The length of the loops is at least 6 inches and the tubes have inside diameters between ¼ inch and 5 inches and a total area of at least 25 square inches. Near the outlet of the condenser, the tube bends upwardly by approximately a diameter to create a water holding portion in the lower most loop of the condenser to restrain condensate and maximize heat transfer.

17 Claims, 9 Drawing Sheets

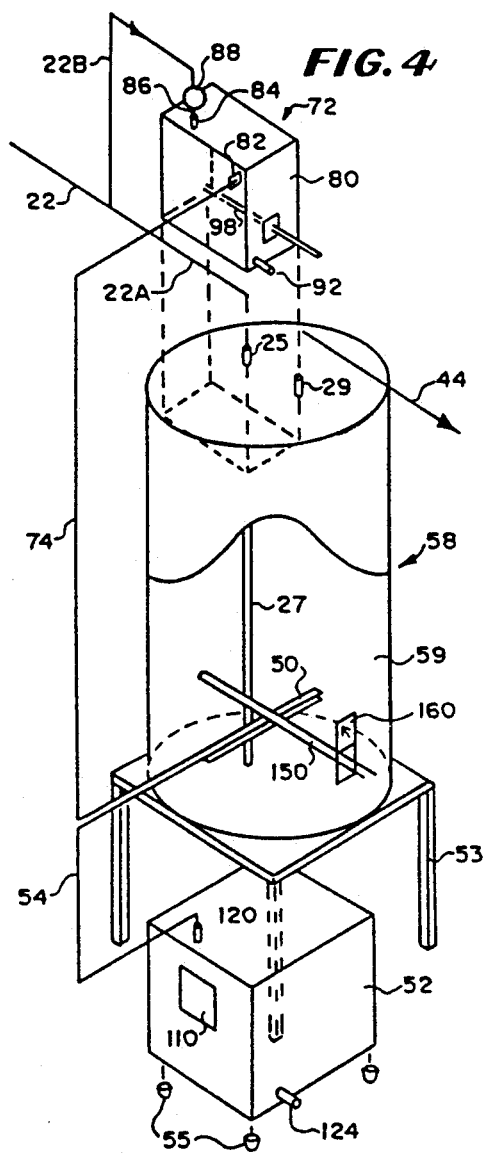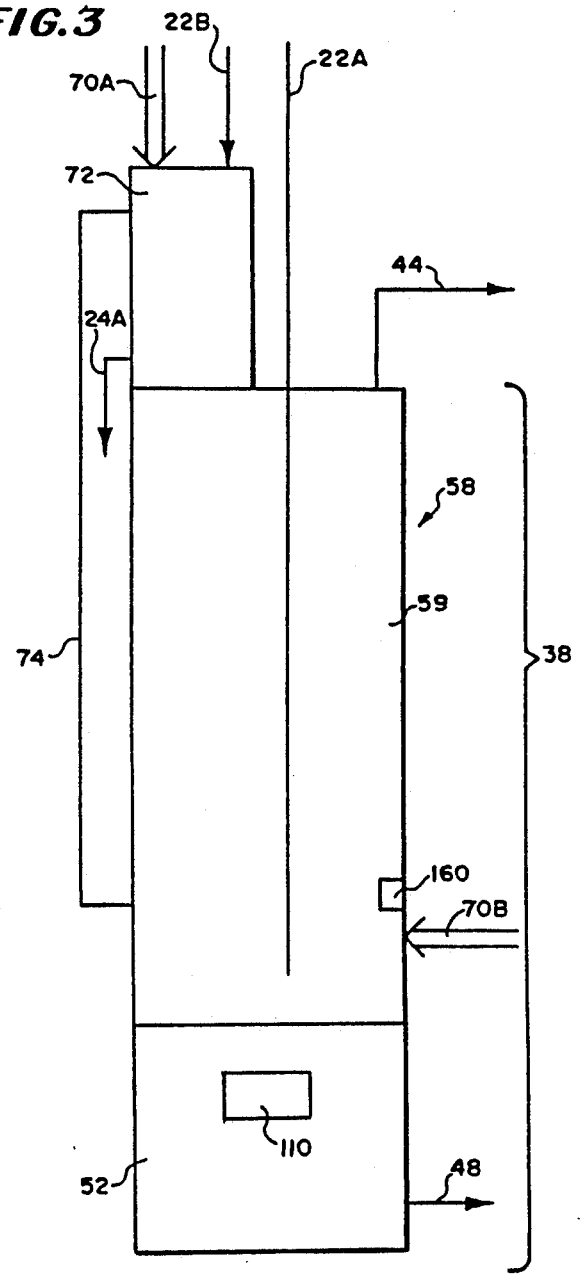

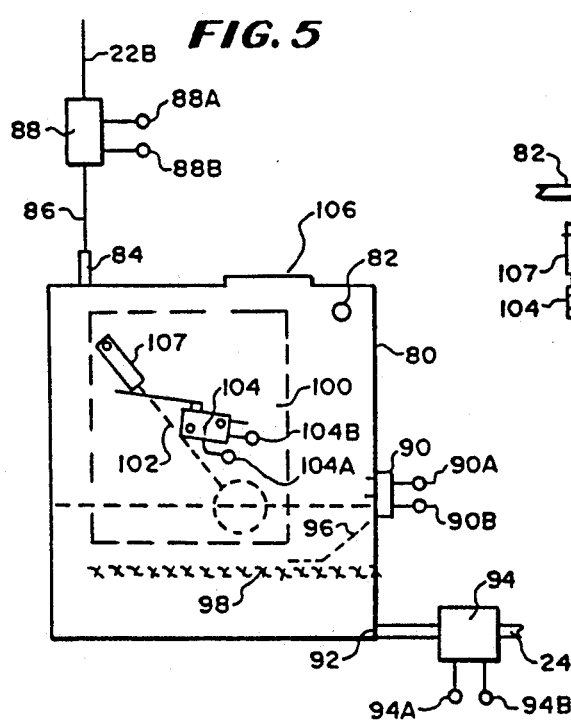
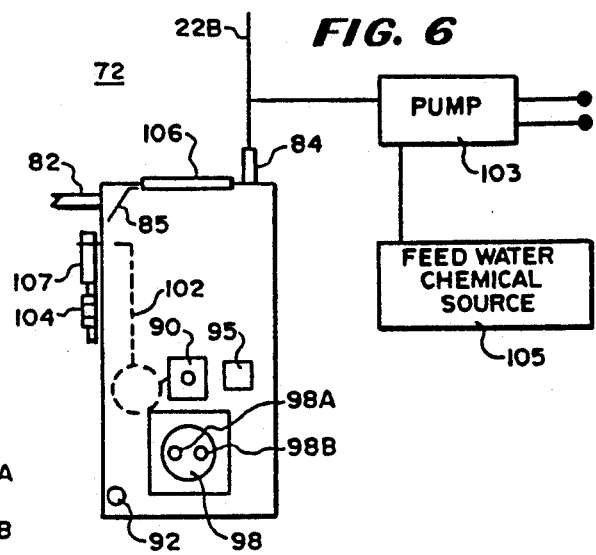
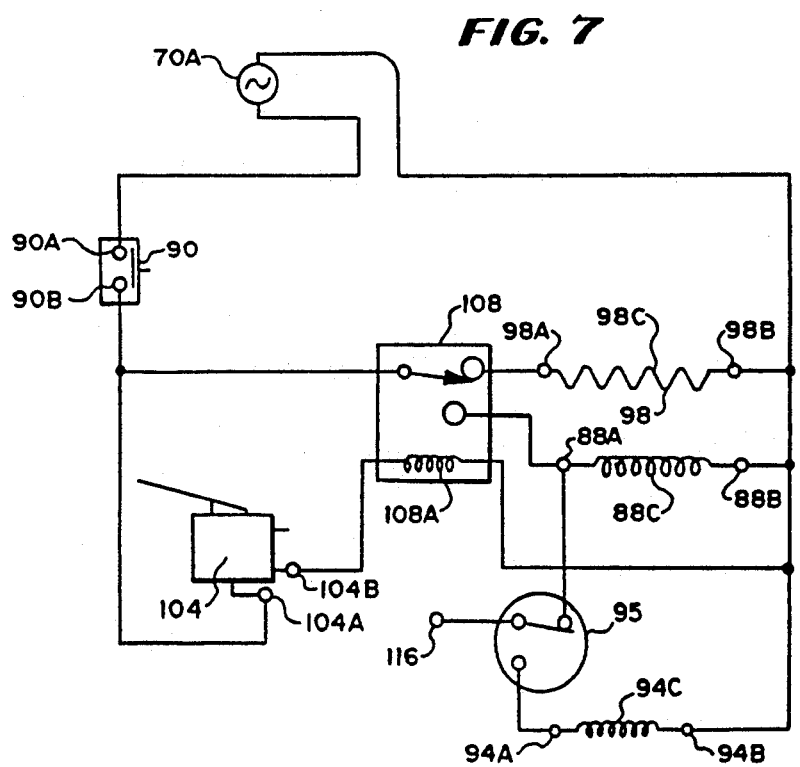

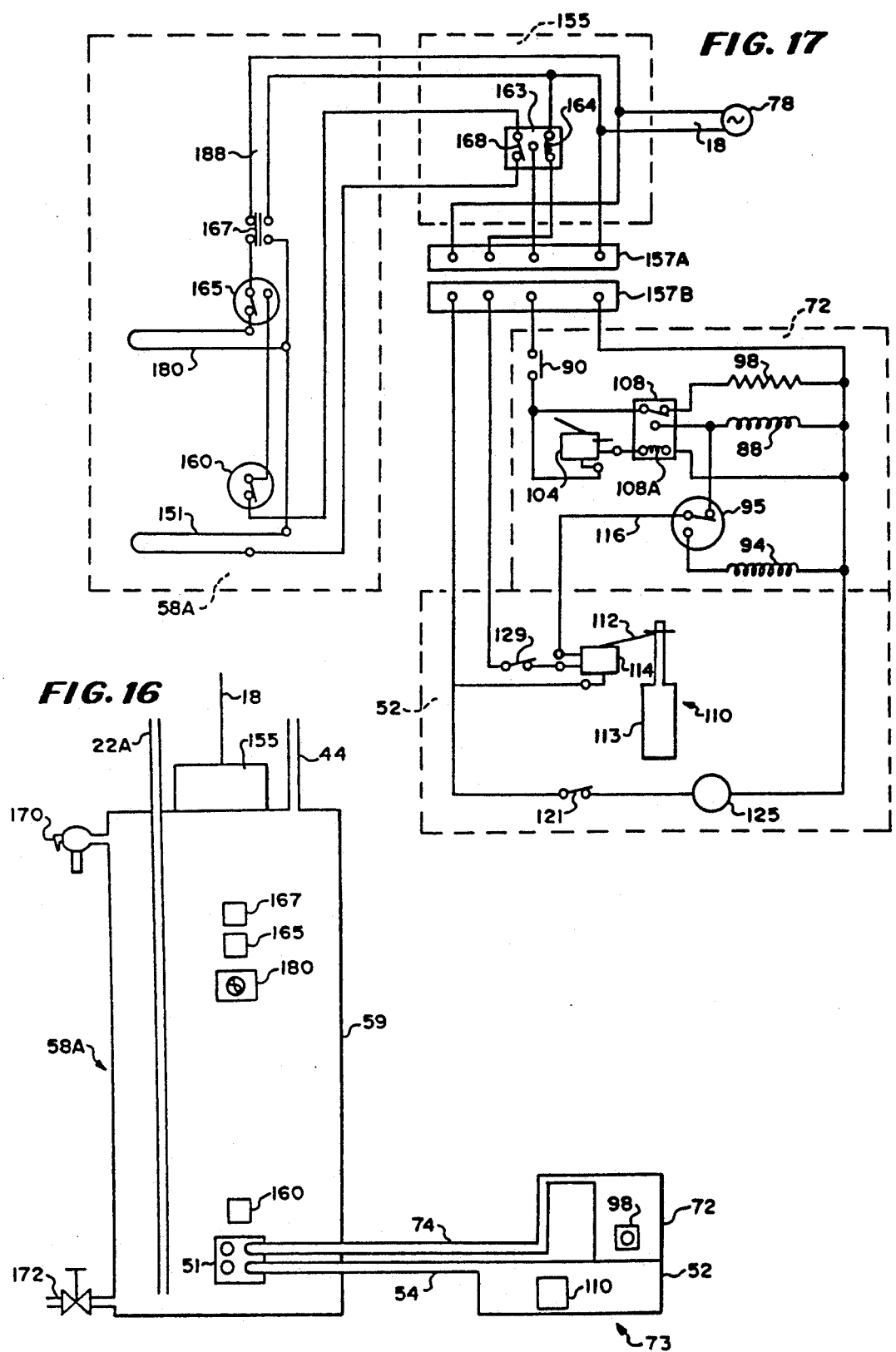

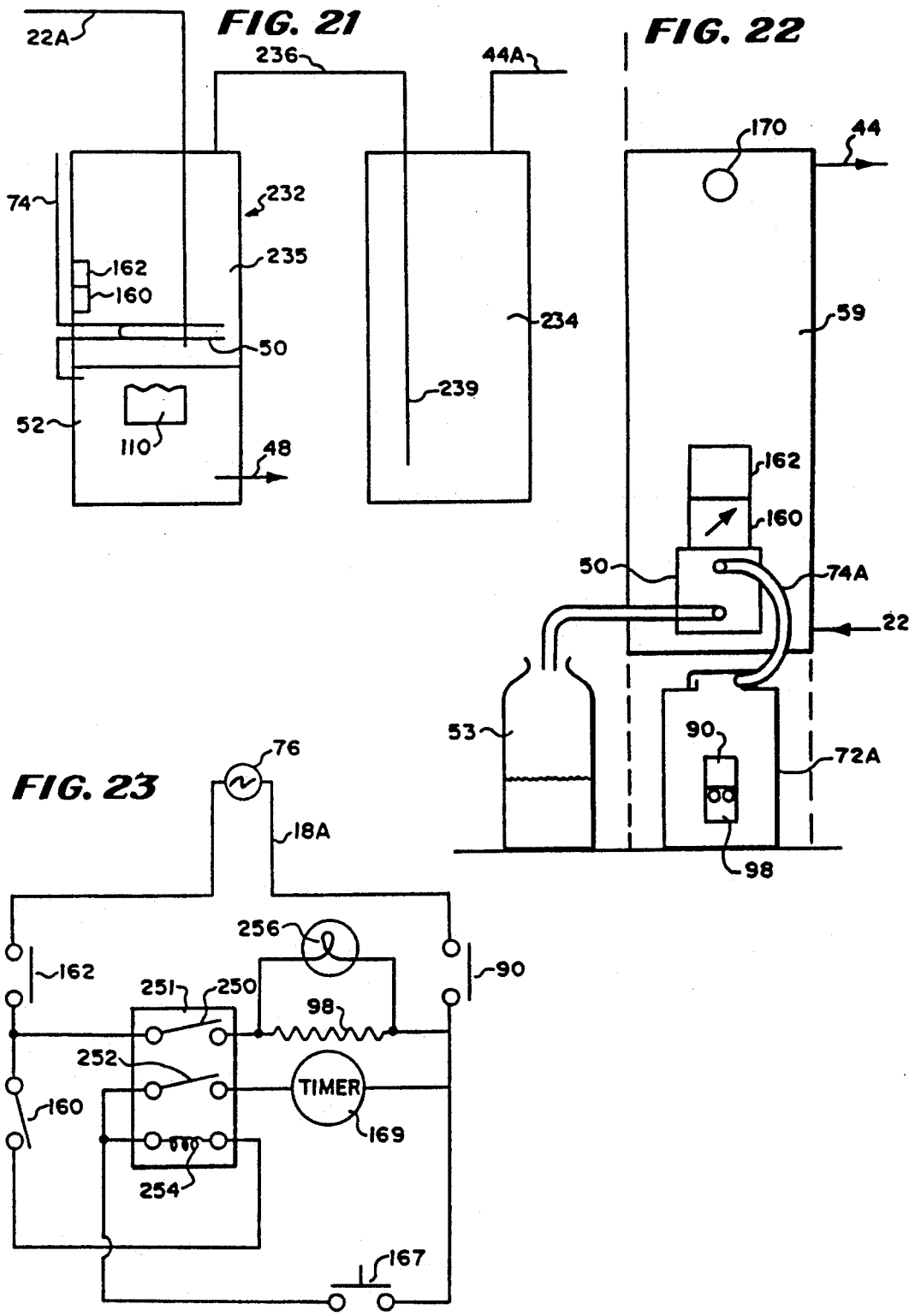

WATER SUPPLY SYSTEM

This is a divisional of copending application Ser. No. 07/030,359, filed Mar. 26, 1987 issued as U.S. Pat. No. 4,906,337.

BACKGROUND OF THE INVENTION

This invention relates to combined systems for supplying both distilled water such as may be used for drinking purposes and hot water such as may be used for domestic purposes such as showers and baths and the like.

In one class of prior art combined distilling and hot water systems, there is a holding tank for the distilled water, an evaporator tank for vaporizing the water and a condenser which communicates between the two to condense the evaporated water into a purified distillate. It has been suggested that the heat removed from the condenser to condense the distillate may be used for heating water.

In one prior art distilling apparatus of this class, the water which receives heat from the condenser is discarded and only the distilled water is used, both as a supply of hot water and as pure water. This type of system is disclosed in U.S. Pat. No. 2,217,266.

Moreover, in the literature relating to this type of apparatuses for distilling water, there have been suggestions that the heat from stills for drinking water be used to supply hot water as well. These prior art disclosures have not suggested how this might be done economically or beneficially and have not disclosed some of the problems associated with such systems.

Three of the problems, for example, are: (1) the difficulty of economically balancing the amount of hot water with the amount of distilled water that is needed in certain applications; (2) the difficulty of economically balancing the type of fuel used for distilled water with the type of fuel used to generate hot water since, in some instances, a more expensive form of energy would be used for distilled water such as electricity than would normally be used to heat water in a household, which might be gas or even sunlight; and (3) condensers used for water cooled distillers may become fouled on the cooling water side by minerals in the cooling water, resulting in a decrease in heat exchange efficiency and possible restriction of the cooling water flow path.

The apparatuses in the prior art disclosures of combination hot water and pure water apparatuses have the disadvantage of not being economical for domestic use and being questionable for laboratory use. They are questionable for laboratory use, the purpose for which some of them are disclosed, because there is no relationship between the demand for hot water and distilled water that has been accommodated by the equipment.

SUMMARY OF THE INVENTION

Accordingly, it is an object of this invention to provide a novel technique for obtaining both distilled water for drinking purposes and undistilled hot water for other types of domestic purposes.

It is a further object of this invention to provide novel apparatuses capable of supplying undistilled hot water upon demand even though it may be in large quantities and distilled water on demand even though the distilled water and undistilled hot water may be required at different times in the course of a day and in different amounts.

It is a still further object of the invention to provide a novel method and apparatus for sharing the energy load between a distilling apparatus and domestic hot water apparatus to conserve energy in an economical manner.

It is a still further object of the invention to provide a novel method and apparatus for distillation that neither releases heat into the air nor dumps significant quantities of heated water to the sewer.

In accordance with the above and further objects of the invention, a combination hot water and distilled water system includes a steam generator that supplies water vapor through a condensing coil and back to a holding tank of sufficient capacity to supply distilled drinking water for a household. The condenser is mounted within and near the bottom of a hot water tank so that the energy given up by the condensing water vapor is usefully deployed in heating at least some of the water in the hot water tank before the water encounters the existing or traditional energy sources. A control means is mounted in the combination hot water and distilled water system to intermittently energize the steam generator under conditions that substantially balance the supply of undistilled hot water and distilled water to normal demand.

In one embodiment, the evaporating heating element in the steam generator is energized when the temperature drops below a predetermined level as measured by a thermostat near the condensing element in the hot water tank. Distilled water is generated upon demand for hot water and stored in the holding tank in sufficient quantity for later use. Excess distilled water is overflowed to the drain.

In another embodiment, the evaporating heating element in the steam generator is energized when the distilled water in the holding tank falls below a predetermined level because of usage, provided the temperature in the hot water tank has dropped below a preset level as measured by a thermostat near the condensing element in the hot water tank. Heat energy is supplied to the water in the hot water tank by either the condensing coil, or from other sources, or a combination of both. Once distilled water demand is satisfied, energy for heating water is provided by sources other than the condensing element.

In still another embodiment, the evaporating heating element in the steam generator is energized whenever either: (1) the distilled water level in the holding tank falls below a predetermined level; or (2) the temperature in the hot water tank falls below a predetermined level. Excess distilled water is dumped if more than a predetermined amount is generated and undistilled hot water from the hot water tank is dumped if the temperature in the hot water tank exceeds a predetermined limit before the level in the distilled water tank rises above the predetermined minimum level.

In all three of the above specific embodiments, the condensing element: (1) is arranged to be close to the cold water entering the system when water is drawn from the hot water tank; (2) is sized and shaped to provide sufficient condensing and cooling to generate distilled water rather than vapor; (3) occupies a low horizontal position in the water tank with multiple loops spaced sufficiently far apart to enable convection between them; (4) is sized and shaped to maximize heat transfer to the water heater; (5) is capable of condensing and partially cooling all the distilled water requirements of a normal domestic household while providing a substantial portion of the heat energy needed to meet the household's undistilled hot water needs withdrawn under normal circumstances; and (6) preferably supplies at least 30 percent of the heat needed for the generation of undistilled hot water withdrawn under normal circumstances but may, under some circumstances, supply more or less of the heat.

Similarly, in each embodiment: (1) the energy of condensing is always used first in meeting hot water demand; (2) feedwater is introduced into the steam generator automatically to replace that which has been distilled over into the holding tank; (3) either hot or cold water can be used; and (4) for overall system efficiency and for cooling prior to dumping, cold water is preferred as feedwater. In very small units such as may be used in recreational vehicles, water may be added manually as needed to the hot water tank and/or still.

In one embodiment, when the steam generator shuts down, the contents of the evaporating tank are automatically drained to maintain distilled water quality and minimize the build up of scale in the steam generator. In still another embodiment, dumping occurs once distilled water demand is satisfied.

In still another embodiment, a preheater is included for the hot water heater and the condenser is mounted in the preheater. To supply hot water from the preheater to the hot water tank as cold water is drawn from the hot water tank, the preheat tank is connected to a cold water source and to the hot water tank. The steam generator may be controlled by the temperature in the preheater water tank or by the distilled water level, but is preferably controlled by both.

In one embodiment, a portion of the path between the condenser and the holding tank is raised sufficiently to create a weir or other obstruction. Condensate fills the path before the weir to ensure maximum surface area is exposed for heat transfer between condensate and the undistilled water. The water-steam interface between condensing and this cooling section will oscillate back and forth but be self regulating.

In operation, as a user draws hot water for domestic purposes in a household, recreational vehicle, hotel or the like, cold water is introduced to a location near a condenser element and thermostat through a pipe, usually from the top of the tank. This step is the same in either a hot water tank or preheat tank but in a recreational vehicle or other small tank the water may be added by manual actuation by a user as hot water is needed.

When the temperature drops below a predetermined level near the condenser of the hot water tank in one embodiment, the distiller operates to generate distilled water and store the water for drinking purposes or ice making purposes or the like. The heat generated in the condensing coil heats water which rises due to having lower density to the top of the hot water tank in one embodiment or the preheat tank in another embodiment. Excess distilled water is discarded.

In another embodiment, as drinking water is used, the water drops below a predetermined level in a holding tank and this causes the steam generator to be energized to generate more distilled water. In still another embodiment, the steam generator is energized only upon both of two events occurring at the same time, one of which is the temperature in the hot water tank dropping below a predetermined temperature and the other being the distilled water falling below a predetermined level. In each embodiment, preheated water may be introduced into the evaporating tank of the steam generator to conserve heat in vaporizing the water.

In a small unit such as may be used in a recreational vehicle with a capacity of less than ten gallons of undistilled hot water and less than one gallon of distilled water, a steam generating cycle is manually started upon need. The user initiates a steam cycle when the distilled water is lower than his needs and he starts it by adding water, if needed, to the vaporizing tank and turning the heater on manually.

The steam from the steam generator flows downwardly to the condenser in all large embodiments and follows the condenser in an upper length of a loop. By the time it reaches a lower length, some of the steam has condensed into water that flows along the lower length into the holding tank below or at substantially the same height as the condenser. Because the holding tank and condenser are below the steam generator in one embodiment, water condensed in the condenser and the pipes leading to and from the condenser flow into the holding tank with little back flow into the steam generator.

In one embodiment, water from the steam generator entering the condenser is collected in a lower length of the condenser by an upwardly extending loop of one portion of the path to fill at least a portion of the path. Steam pressure may move the water-steam interface at this portion but the head of water pressure retains at least some water filling a portion of the path near the exit of the condenser from the hot water tank to maximize heat transfer in the condenser by substantially eliminating the flow of steam through the condenser without releasing heat from condensation while maximising the area of contact between the condensate and the undistilled water. The length of the condenser in the preheater or hot water tank is sufficient so that substantially all of the moisture entering it is steam and substantially all of the steam is condensed in the condenser.

In another embodiment the condensing coils and an electric heating element are combined on a single flange. The combined heating element can be used to directly replace the electric heating element in the base of a conventional electric water heater. When there is a demand for energy to heat up undistilled water, control circuitry decides whether the electric element is to be energized (no demand for distilled water) or the steam generator is to be energized to provide heat through the condensing coil cooling of steam (needed for distilled water).

As can be understood from the above description, the combined distilling and hot water system of this invention has several advantages, such as: (1) it produces distilled water at a reduced energy cost due to the heat of condensation being re-used to provide hot water; (2) no increased load is placed on the air conditioning systems nor are large volumes of heated water dumped to sewer; (3) it is capable of producing a continuous supply of hot water with the ability for fast recovery; (4) a condensing element is provided which, when located near the bottom of the tank, is efficient in both condensing water vapor and cooling condensate while maximizing the storage volume of hot water; (5) it produces hot water of controlled maximum temperature; (6) it can produce distilled water to meet the requirements for drinking and cooking while meeting the hot water needs of an individual or family; (7) the condensing element can be easily removed for cleaning should the outer surface become coated with scale; and (8) the equipment may be used to retrofit existing water heaters.

BRIEF DESCRIPTION OF THE DRAWINGS

The above noted and other features of the invention will be better understood from the following detailed description when considered with reference to the accompanying drawings in which:

FIG. 3 is a schematic diagram of a combined still and hot water heater which may be used in the embodiments of FIGS. 1 and 2;

FIG. 4 is an exploded, simplified perspective view of the hot water heater and distiller of FIG. 3;

FIG. 5 is a schematic elevational view of the steam generator which is a portion of FIG. 4;

FIG. 6 is a front elevational view of the steam generator of FIG. 5 with connections;

FIG. 7 is a schematic circuit diagram of a system for the control of feedwater and for heating element protection which system may be used with the embodiment of FIG. 4;

FIG. 16 is an elevational view of another embodiment of domestic combined hot water and distilled water system;

FIG. 17 is a circuit diagram of a control system useful in the embodiment of FIG. 16;

FIG. 21 is a schematic diagram of still another embodiment of combination still and hot water system;

FIG. 22 is an elevational view of still another embodiment of combined still and hot water system; and FIG. 23 is a schematic circuit diagram of an energy control circuit useful in the embodiment of FIG. 22.

DETAILED DESCRIPTION

Figure 1:
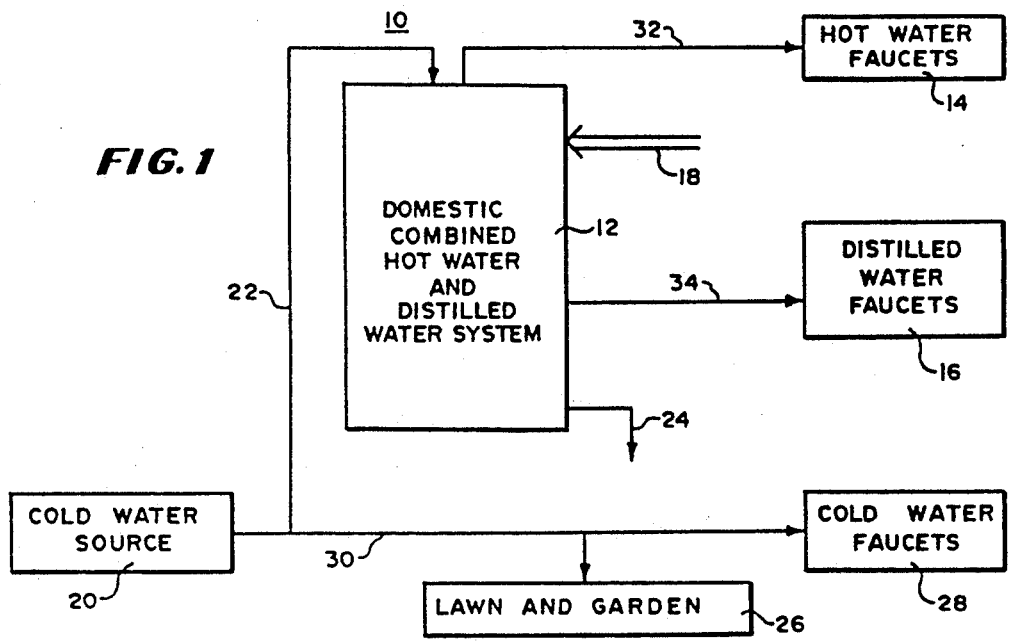
FIG. 1 is a block diagram of a domestic hot water, cold water and drinking water system.

In FIG. 1, there is shown a block diagram of a domestic water system 10 having a domestic combined hot water and distilled water system 12, hot water faucets 14 and distilled water faucets 16. The domestic combined hot water and distilled water system 12 is connected to the hot water faucets 14 through plumbing 32 within a house or apartment building or the like and to distilled water faucets 16 through plumbing 34 within the same house or apartment or other building to supply both hot water and distilled water upon demand.

In this embodiment, the domestic combined hot water and distilled water system 12 is energy efficient in distilling water and preparing hot water in a manner that provides sufficient hot water for general uses of the occupants and sufficient distilled water such as for drinking or the like with a minimum amount of heat.

To provide the distilled water and hot water, the domestic water system 10 includes a source of energy, a source of water and access to a disposal for water. In the preferred embodiment, the source of fuel to heat the water and generate distilled water is electrical and is supplied by a connection 18 to the main power supply and the source of water is a source of cold water 20 supplied from a municipal source or a pump or the like to the domestic integrated hot water and distilled water system 12.

The domestic combined hot water and distilled water system 12 is connected by plumbing 24 to a sewer system or other means of disposing of water not otherwise supplied to the hot water faucets 14 or distilled water faucets 16 but nonetheless utilized within the domestic integrated hot water and distilled water system 12. The same source of cold water 20 is applied to other outlets for use on lawn and gardens 26 and to cold water faucets 28 within the house.

Figure 2:
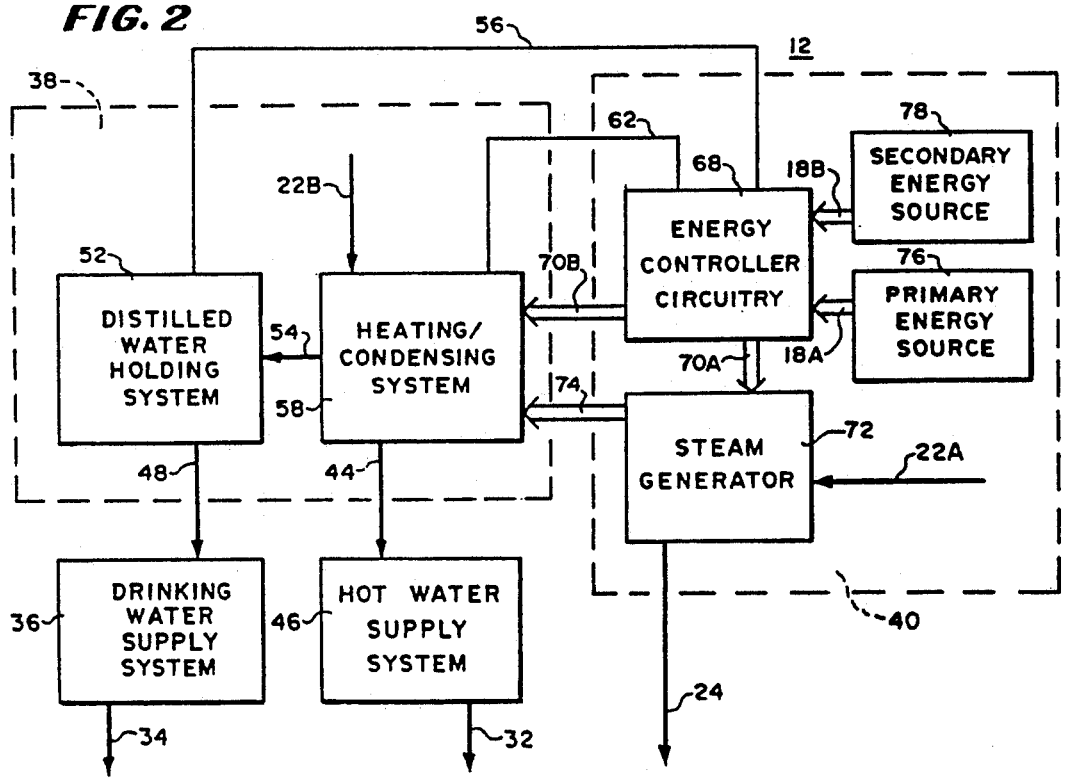
FIG. 2 is a block diagram of one embodiment of the system of FIG. 1.

In FIG. 2, there is shown a block diagram of one embodiment of domestic integrated hot water and distilled water system 12 having a combined still and hot water system shown generally at 38, an energy input control system shown generally at 40, a drinking water supply system 36, and a hot water supply system 46. The combined still and hot water system 38 is connected to the drinking water and hot water supply systems 36 and 46 to supply water thereto and to the energy input control system 40 to receive energy therefrom.

To receive and supply water, the combined still and hot water system 38 is: (1) connected through a conduit 22B to a cold water source to provide water for the heating/condensing system 58; (2) connected through a conduit 48 to a drinking water supply system 36 for application to faucets 16 (FIG. 1); and (3) connected through a conduit 44 to a hot water supply system 46 for application to faucets 14 (FIG. 1) for showers or the like.

To receive and discard water, the steam generator 72 of the energy input control system 40 is: (1) connected through a conduit 22A to a water source to receive feedwater; and (2) electrically and physically connected to a drain valve controller (not shown in FIG. 2) through which water is emptied from the evaporating tank in the steam generator 72 through a conduit 24, thus discarding water which contains concentrated impurities from the evaporation of water.

The combined still and hot water system 38 receives electrical energy from the energy input control system 40 through cable 70B and energy in the form of steam through steam conduit 74. To supply energy for distilling water and heating water, the energy input control system 40 includes a primary energy source 76 that provides energy for the steam generator 72, and a secondary energy source 78 that provides energy for heating water in the heating/condensing system 58.

To control the application of energy to the steam generator 72 and the heating/condensing system 58, the energy controller circuitry 68 receives information through cable 56 from level sensors (not shown in FIG. 2) in the distilled water holding system 52, and through cable 62 from temperature sensors (not shown in FIG. 2) on the heating/condensing system 58. This information separately indicates demand for distilled water and demand for undistilled hot water.

When there is demand for both distilled water and hot water, the energy controller circuitry 68 sends energy from the primary energy source 76, through fuel line 70A to the steam generator 72. The steam produced travels through steam conduit 74 into the condensing coil (not shown in FIG. 2) in the heating/condensing system 58. Distilled water is produced and at the same time the energy of condensation and cooling is released for heating water. When the demand is for hot water only, energy controller circuitry 68 directs energy from the secondary energy source 78 through the fuel line 70B directly to the heating/condensing system 58 for heating water. The fuel lines are intended to include lines for any type of energy such as electrical energy or gas or oil.

The primary energy source 76 and secondary energy source 78 are both electrical in the preferred embodiment although one or both could be gas or some other form of fuel. In a typical domestic situation, more energy is needed for hot water production than is released on condensing steam to provide the drinking water requirements. Hence, all the energy released on condensing can be usefully deployed and the balance made up by the secondary energy source 78.

Heating hot water in the heating/condensing system 58 by using the primary energy source 76 to make steam in the steam generator 72 and condensing the steam in a condensing coil in the heating/condensing system 58 is less efficient than direct heating using the secondary energy source 78. This is due to: (1) the need to heat the feedwater for steam generation from cold to boiling; (2) heat losses that are associated with the steam generator 72 and steam conduit 74; and (3) the energy associated with the distillate which is at higher temperature than the cold feedwater. Hence, the most efficient use of energy is made when the steam generator 72 is used only when there is a demand for distilled water. This is achieved by the system above in FIG. 2, and described above.

In the embodiment of FIG. 2, when the distilled water in the distilled water holding system 52 drops by more than 2 gallons in a distilled water holding system holding no more than 10 gallons, one of the two conditions for generating steam is fulfilled and if the temperature in the hot water tank has dropped lower than 150 degrees Fahrenheit, the other condition is fulfilled. When both have been fulfilled, the steam generator is energized. In distilled water holding systems with a larger capacity, the water low signal is developed when the distilled water drops by more than 20 percent of the total capacity and the temperature low signal is developed under the same conditions.

While the above parameters are the preferred embodiment, other values are possible for them. In any event, the volume drop that causes a condition for generating steam should be more than one gallon and a drop in temperature for the hot water tank below 100 degrees Fahrenheit satisfies the other condition for generating steam in domestic hot water heaters.

In one embodiment when the distilled water level falls below a preset value the steam generator is energized even when the temperature in the hot water tank is at or above set point. The low signal causes hot undistilled water to be discharged from the top of the hot water tank into the sewer until such time as the thermostat closes due to the entry of cold water near the bottom of the tank. The amount of water left in the distilled water holding tank triggering energization is different to the above. It should be not more than 5 gallons nor less than 1 quart.

In FIG. 3, there is shown a schematic diagram of the combined still and hot water system 38 and the steam generator 72. The heating/condensing system 58 is positioned above the distilled water holding system 52, both of which are part of the combined still and hot water system 38, and the steam generator 72 is positioned above the heating/condensing system 58. These components share certain parts and communicate with each other to economically prepare distilled water and hot water.

The steam generator 72 receives energy from a fuel line 70A, which in the preferred embodiment is an electrical connection, and supplies steam through a steam conduit 74 to the condensing coil of the heating/condensing system 58. Replacement feedwater is supplied through conduit 22B and this replacement water may come from a cold water source or from some other source. Generally, it supplies water for distilling. Water which has a higher concentration of impurities because of the distilling action, is drained through conduit 24A and usually discarded.

The heating/condensing system 58 communicates with the steam generator 72 to receive heat therefrom and to provide condensing in an economical manner. It receives cold water for heating through a conduit 22A and supplies heated hot water through a conduit 44. The replacement feedwater supplied to the steam generator 72 through the conduit 22B may originate in some embodiments from the heating/condensing system 58 through conduit 44 or from any other source in other embodiments, such as for example, a municipal source.

The distilled water holding system 52 communicates with the heating/condensing system 58 to receive distilled water. Distilled water is supplied from the distilled water holding tank 52 by a conduit 48.

The heating/condensing system 58 includes a hot water tank 59 having a heating element mounted in it. The heating element is electrically connected to a fuel line 70B. Temperature sensor 160 monitors the temperature of water inside the heating/condensing system 58 while level sensors 110 monitor the level of water in the distilled water holding system 52. This information is conveyed to the energy controller circuitry 68 (FIG. 2)

When the temperature sensor 160 indicates a need for heating to achieve the predetermined hot water temperature, the energy controller circuitry 68 (FIG. 2) checks distilled water demand as indicated by the level sensors 110. If there is a demand for distilled water as indicated by a low level in the distilled water holding system 52, it provides energy to steam generator 72 to meet the hot water demand by producing distilled water. If no demand exists for distilled water, energy is routed through fuel line 70B to the electrical heating element mounted in the heating/condensing system 58.

With this arrangement, the distilled water need can be met while satisfying hot water demand. The electric heating element mounted in the heating/condensing system 58 provides any additional heating needed to satisfy the undistilled hot water demand once the distilled water demand has been satisfied. The rate at which hot water can be heated is an important factor in the design of a domestic hot water system.

Because the distiller is being used as the primary source of energy for water heating, it is advantageous to have as high an energy input for distilling water as can be: (1) used in an economical manner to prepare distilled water; and (2) is able to be condensed in the water heater commensurate with normal energy input levels to domestic water heating systems including recreational vehicle hot water heating systems. Hence, power input can be as high as 4,500 watts but preferrably is in the range of 500–2,500 watts. This produces from 1/6 to 5/6 gallons of distilled water per hour.

The electric heating element installed in the hot water tank 59 of the heating/condensing system 58 should be no smaller than that in the steam generator 72 and, for recovery purposes, be up to 4,500 watts. Tank size and electrical voltage will determine the upper limit. Economics relating to switching, wiring and other electrical components also play a role in establishing economic size.

Generally, for every 10 gallons of hot water taken from the hot water supply system 46 (FIG. 2), between 0.5 and 1.0 gallons of distilled water can be produced and stored in the distilled water holding system 52 for supply through the drinking water supply system 36 (FIG. 2). The heating/condensing system 58 should have a capacity of between 20 to 100 gallons to accommodate a typical family but commonly is of 40 to 80 gallons. The distilled water holding system 52 should preferably have a capacity of between 4 to 10 gallons to accommodate a typical family but in any event the capacity should be between 1 gallon to 15 gallons.

While in this embodiment, the heating/condensing system 58 has a single electric heating element, the system can include an additional upper element and temperature sensor (not shown in FIG. 3) to promote fast recovery following major demand for hot water. This approach is well-known in the art of electric water heater manufacture.

In FIG. 4, there is shown a simplified exploded perspective view of the heating/condensing system 58, the steam generator 72, and the distilled water holding system 52, as shown in FIG. 3, with the heating/condensing system 58 being supported on a stand 53 and the distilled water holding system 52 being of a size that permits it to fit within the stand 53 so as to be underneath the heating/condensing system 58. The steam generator 72 is positioned on top of the heating/condensing system 58.

This arrangement keeps the floor space taken up by the system to no greater than that occupied by a water heater having the same diameter tank as that used for the heating/condensing system 58. Most domestic electric water heaters are no greater than 25 inches in diameter and no higher than 55 inches. This space above them is usually wasted and can be used by this system. Preferably, the distilled water holding system 52 is located so distillate can run from the condenser 50 into the distilled water holding system 52 under the effects of gravity, either below the hot water (heating/condensing) system 58 or next to it.

The steam generator 72 has an evaporating or vaporizing tank 80 generally in the shape of a parallelopiped having a flat bottom surface resting upon the upper surface of the insulated heating/condensing system 58. It includes a heating element 98 which, in the preferred embodiment, is electrical; a drain outlet port 92 for draining water; a feedwater inlet port 84 communicating with the conduit 22B through a valve 88; and a steam outlet port 82 communicating through a steam conduit 74 with a condenser 50.

To receive cold water and to supply hot water, the heating/condensing system 58 includes the condenser 50, a downspout 27, and an outlet port 29. The inlet port 25 is connected to a cold water inlet line 22A and to the downspout 27 which extends to a location adjacent to the condenser 50 near the bottom of the heating/condensing system 58. The hot water outlet port 29 communicates with the conduit 44 to supply domestic hot water.

The heating/condensing system 58 has walls of generally cylindrical shape with cylindrical side surfaces. The outer shell has a horizontal flat bottom and top surfaces although an inner wall has domed top and bottom surfaces as known in the art. It is designed to safely operate with working pressures up to 150 pounds per square inch, in this respect being identical to standards for water heaters. It is well insulated to minimize heat loss and has a thin metal or plastic external cladding to protect the insulation. The bottom surface rests upon the stand 53 and the top surface is adapted to contain the outlet port 29 for hot water and the inlet port 25 for connection to the downspout 27.

To hold distilled water, the distilled water holding system 52 is a parallelopiped with a flat bottom resting on 4 feet 55 and having flat sides. It includes a distilled water outlet port 124 communicating with the drinking water supply system 36 (FIG. 2) through the conduit 48 (FIG. 3) and an inlet port 120 communicating with the condenser 50 to receive distilled water for holding in the distilled water holding system 52 for use as drinking water. It includes level sensors 110.

To receive energy over and above that from the condensing of steam in the condenser 50, the heating/condensing system 58 includes an electrical immersion heating element 150 located approximately 1 inch above the condenser 50 and running preferably perpendicular to the condenser 50. A variable thermostat 160 is mounted immediately above the heating element 150.

While in the above embodiment, the electric heating element 150 is located above the condenser 50, the order can be reversed or the heating element and condenser may be mounted side by side. For this case, the two elements would most likely be parallel. However, the temperature sensor 160 must be mounted immediately above the higher of the two devices.

The steam generator 72 can be located below the condenser 50, alongside the condenser 50, or above the condenser 50. Locating the steam generator 72 above the condenser 50 gives the maximum distilled water production for unit energy input into the steam generator 72 because steam condensing in the steam conduit 74 runs towards and into the holding tank whereas, when positioned below the condenser (for example, alongside the distilled water holding system 52), condensed steam runs back into the steam generator, thus requiring extra energy to redistill.

When cold makeup water is added in the steam generator 72, a vacuum is induced in the evaporator tank 80. This vacuum sucks condensate in the condenser 50 and connecting steam conduit 74 back towards the steam generator 72. Placing the steam generator above the water tank minimizes the draw back of distillate into the steam generator. Moreover, the location of the steam generator 72 above the water tank or along side of it makes for easier access for maintenance.

Because the evaporator tank 80 is regularly drained, it is advantageous for it to be at a height sufficient to permit easy flow to a sewer drain. To reduce heat losses, the evaporator tank 80 and steam conduit 74 need to be well insulated as does the heating/condensing system 58. The conduit 74 must be sufficiently short or well enough insulated to reduce the loss of heat between the steam generator 72 and the condenser 50.

The condenser 50 should be spaced from the bottom of the hot water tank a sufficient distance to permit convection currents large enough to avoid temperature increases in captive water between the bottom of the tank and the condenser. This distance should not cause a temperature differential of more than 50 degrees Fahrenheit between the bottom of the condenser and its top. Generally, it should be no closer than ½ inch from the closest part of the bottom.

On the other hand, the water below the condenser at a distance not receiving heat by contact with the lower part of the condenser does not contribute to the hot water storage. Accordingly, the lower condenser should be as low as possible and not a greater distance from the bottom of the tank than ⅓ of the distance between the top and bottom of the tank.

In FIG. 5, there is shown a side elevational view of the steam generator 72 in which the evaporator tank 80 is made out of stainless steel and formed as a right rectangular parallelopiped with a width of 6 inches, a length of 10 inches and a height of 10 inches. It includes a lid at its upper end 106, an electrical heating element 98, a drain outlet port 92 extending through its lower end, an outlet port 82 for steam, and a water inlet port 84 for feedwater in its upper end.

With this arrangement, water for evaporation enters the water inlet port 84 and is heated by the electrical heating element 98 until it vaporizes, at which time it is forced by pressure into the condenser through the outlet port 82. Periodically, or when the distilled water demand is satisfied, the remaining liquid is drained.

The feedwater valve 88 may be any solenoid valve openable automatically in response to a signal from the level detector 100 to supply water until the level detector 100, terminates its signal. A suitable valve is sold by Eaton Manufacturing Corporation, Controls Division, 191 East North Avenue, Carol Stream, Ill. 60188, under the designation S30-PAH-120.

The level detector 100 consists of a float 102 and actuator 107 mounted to activate a push-button switch 104 as the water level changes. A suitable switch is sold under the trademark "Microswitch" by Microswitch, Dept. 740, Freeport, Ill. 61032, with designation V3L-131-D8.

Thus, as the water level falls inside the evaporator tank 80 due to evaporation, the float 102 and actuator 107 movement causes the switch 104 to close. This results in a signal being transmitted (not shown in FIG. 5) to the feedwater valve 88 to cause water to be added. Once the water has risen to its normal level, the switch 104 opens to terminate the flow of water into the evaporator tank 80. A logic circuit to be described hereinafter protects the heating element 98 from overheating in the event that feedwater makeup controlled by float 107 malfunctions.

To further protect the apparatus against overheating in the event of a lack of adequate water, a copper heat tab 96 provides a path of low thermal resistance from the heating element 98 to the wall of the evaporator tank 80 on the outside of which is secured a high-limit thermostat 90. This thermostat 90 interrupts electrical power to the steam generator should its temperature rise above 220 degrees Fahrenheit. A suitable type thermostat is made by Thermo Disc Inc., a subsidiary of Emerson Electric Co., P.O. Box 3538, Mansfield, Ohio 44907, under style 1912 type HLC. If it opens, the steam generator 72 remains electrically isolated until the thermostat 90 is manually reset.

To supply energy to the heating element 98 which serves as the primary source of energy, a 120 volt AC source is supplied from the energy controller circuitry 68 (FIG. 2). Any type of suitable electrical heating element may be utilized having a rating of between 500 and 3,000 watts. In the preferred embodiment, the electric heating element is a 1,500 watt heating element of the type sold by Emerson Electric Company, E. L. Weigand Division, 641 Alpha Drive, Pittsburg, Pa. 15238, with the designation TGCI-2157×5.

To periodically drain fluid from the evaporator tank 80, the drain outlet port 92 is connected to a drain valve 94 for discharge through conduit 24 to the sewer line. The drain valve 94 is electrically connected through conductors 94A and 94B to be closed when the power is disconnected and opened when it is connected. A suitable type of valve is sold by Erie Controls, a division of Erie Manufacturing Company, 4000 South 13th Street, Milwaukee, Wis. 53221, under designation number 0691C0408HB00.

When there is concern at discharging boiling water from the evaporator tank into the sewer because, for example, plastic sewer pipes may be damaged by the high temperature, the drain circuit logic can be modified so that cold feedwater is added to the evaporator tank before the drain valve 94 is opened. The drain valve 94 is connected through bimetal disc temperature control 95 to be closed when power is disconnected and open when connected.

In FIG. 6, there is shown a front elevational view of the steam generator 72 showing the float 102 connected through the wall of the steam generator to actuator 107 which contacts the push-button switch 104 when the float 102 drops to a low level. A deflector plate 85 is attached to the top wall and extends at an angle within the steam generator in the path of steam flowing through the steam outlet 82. This angled plate 85 stops direct access between the agitated water surface within the steam generator 72 and the steam outlet 82 to minimize droplets splashing into the outlet 84 and being carried into the steam conduit 74 by the velocity of the steam.

To provide chemical additives which reduce the amount of scale on the heating element and within the evaporator tank, the water inlet port 84 is connected through a "T" connection through two paths, which are: (1) to a solenoid operated valve 88 to the source of feedwater 22B to receive feedwater; and (2) through a feedwater chemical pump 103 to a source of feedwater chemicals 105 to provide known additive chemicals in a manner known in the art.

The chemical pump may be any small metering pump activated automatically in response to the same electrical signal as feed water valve 88 to supply metered increments of chemicals during feedwater addition. A suitable pump is the pump sold by Dias Incorporated, Box 3188, Kalamazoo, Mich. 49003.

Water close to boiling temperatures can cause problems with modern plastic sewer systems. To avoid dumping near boiling water to drain when the evaporator tank 80 is periodically drained, a bimetal disc temperature control 95 is mounted against the outside of the evaporator tank 80 adjacent to the high-limit thermostat 90. The bimetal disc temperature control 95 is a single pole, double throw electrical switch activated by a bimetal disc. At high temperatures, the switch adopts one position; while below a desired temperature, it switches to a second position. A suitable type of bimetal disc temperature control is sold by Therm-O-Disc, Incorporated, a subsidiary of Emerson Electric Company, P.O. Box 3538, Mansfield, Ohio 44907, with designation 6DT-SPDT with open temperature 180 degrees F. (Fahrenheit)and close temperature 160 degrees F.

In operation, when the steam generator 72 (FIG. 2) shuts down and the evaporator tank 80 needs to be drained, power is connected to the common terminal of the bimetal disc temperature control. If it senses a temperature above 180 degrees F., this power is relayed to the fresh water solenoid valve 88 (FIG. 5) and cold water is added to the evaporator tank 80 until the temperature of the disc falls below 180 degrees F. This results in the SPDT switch changing position and power being removed from the water solenoid 86 (FIG. 5) and connected to the drain valve coil terminal 94A which results in the drain valve 94 opening and the evaporator tank 80 being drained.

The specific structure of the steam generator 72 is not novel separately from the novel combination with a hot water system except for the dilution control and drain function. Similar steam generators are sold by Pure Water Inc., Lincoln, Nebr., as a component in their air-cooled distillers, and the parts in it are substantially the same as those sold in that distiller for a different purpose.

The steam generator should be of sufficient size to: (1) supply consistently high quality distilled water in one cycle representing at least 20 percent of the capacity of the distilled water tank; (2) for recreational vehicles have an amount of feedwater left after a cycle of generating distilled water which is at least 5 percent of the normal starting feedwater such as, for example, 0.4 pint for a 1-gallon steam generator; (3) for units other than recreational vehicle units, add feedwater continuously or initiate a cycle for supplying feedwater as needed such as when the feedwater volume in the steam generator falls below 90 percent of the total normal starting volume of feedwater; and (4) have a starting or operating water volume of preferably between ½ and 1/5 the volume of distillate supplied to the holding tank in a typical cycle.

The steam generator should have a volume as small as possible to avoid the loss of heat needed to increase an excess volume of water from room temperature to boiling but not so small as to increase maintenance cost because of solid precipitation and scaling and impair distilled water quality.

In FIG. 7, there is shown a schematic circuit diagram of control circuitry utilized to control the heating element 98 and the feedwater valve 88 having a source of 120 volt AC power 70A which may be supplied by the mains power source in the house through the energy controller circuitry 68 (FIG. 2), the high limit thermostat 90, the push-button switch 104, a relay 108, the element 98C of the heating element 98 (FIG. 5), the solenoid winding 88C of the solenoid controlled feedwater valve 88 (FIG. 5), the motor winding 94C of the drain valve 94, and the bimetal disc temperature control 95 (FIG. 6)

The high limit thermostat 90 is electrically connected in series with the source of AC potential 70A through terminals 90A and 90B so that when the temperature exceeds the preset limit, it opens and cuts off power to the remainder of the circuit. Thus, power is cut off from the element 98C irrespective of the position of the relay 108.

Terminal 90B of the high-temperature thermostat 90 is electrically connected to one input terminal, 104A of the push-button switch 104, the other terminal 104B being electrically connected to one side of the relay winding 108A. The other end of the solenoid relay winding 108A is electrically connected back to the source of AC power 70A so that the solenoid coil 108A of the relay 108 is energized when the float 102 (FIG. 5) closes the push-button switch 104 to connect the AC power through the solenoid winding 108A.

The relay 108 is a single-pole, double-throw relay having its common contact electrically connected to terminal 90B to receive power unless the temperature of the high-temperature thermostat 90 is exceeded. The normally closed contact is electrically connected to terminal 98A of the heating element 98, the terminal 98B being connected to the source of power so that when the armature is closed against this contact and the thermostat has not been actuated by an excessive temperature, the element 98C is energized.

The normally open contact of the relay 108 is electrically connected to terminal 88A of the solenoid coil 88C and the terminal 88B is electrically connected to the source of power so that the solenoid operated valve 88 (FIG. 5) is actuated when power is supplied through the thermostat 90 and the armature of the relay 108 is in its second position. The heater is disconnected at that time. A suitable single pole, double throw relay 108 is made by Omron Electronics, Inc., One East Commerce Drive, Schaumberg, Ill. 60195, with designation 64B-112T-C-USAC-120.

With this arrangement, a temperature so high as to activate the high-temperature thermostat 90 will disconnect the power. Operation will cease until the high limit thermostat 90 is manually reset. If the water drops below that sensed by the float 102, (FIGS. 5 and 6) the relay 108A is energized by the push-button switch 104 closing, thereby actuating the solenoid operated feedwater valve 88 and adding water. At the same time, the element 98C is disconnected from power. When the water reaches its desired level, the coil 108A is de-energized and power again applied to the element 98C.

The bimetal disc temperature control 95 is a single pole, double throw switch activated by a bimetal disc. The common terminal receives power through conductor 116 from the holding tank level sensor 110 (FIG. 3). The normally closed contact (at high temperature) is connected electrically to feedwater valve coil terminal 88A. The other contact is connected to the drain valve motor coil terminal 94A.

When power is connected through conductor 116, the action that follows depends upon the temperature of evaporator tank 80. If it contains very hot water, the bimetal disc temperature control 95 will cause power to be applied to the coil of water solenoid 88. Cold water will be added to the boiling tank cooling down the contents until the falling temperature activates the bimetal disc switching over from the feedwater valve coil 88C to the drain valve motor coil 94C. The drain valve 94 opens and the cooler contents are drained to sewer.

While level control has been described in terms of a float system, alternative forms of sensing can equally be used based upon conductivity, light reflection or the like. These are known in the art of liquid level control.

The float 102, and actuator 107 together with the push-button switch 104 can be replaced by a single electrode mounted in the tank but insulated electrically from the metal forming the tank. It is placed so as to break contact with the water at the desired level of operation. The water completes an electrical circuit between the walls of the tank and the level probe so that when the level falls to where contact with the probe is broken the circuit is no longer complete.

A circuit board incorporating a short time delay is electrically connected to the probe and metal tank and can perform the same switching function between the feedwater solenoid valve and the heating element as shown in FIG. 7. Such a controller is manufactured by Warwick Controls Inc., 1964 West Eleven Mile Road, Berkley, Mich. 48072, with designation 16N1BO-10-1. The same company also manufactures electrodes designated 3H. This embodiment may be desirable for high volume production but the embodiment of FIGS. 5 and 6 is generally less expensive when producing a relatively small number of combined stills and hot water heaters.

Figure 8:
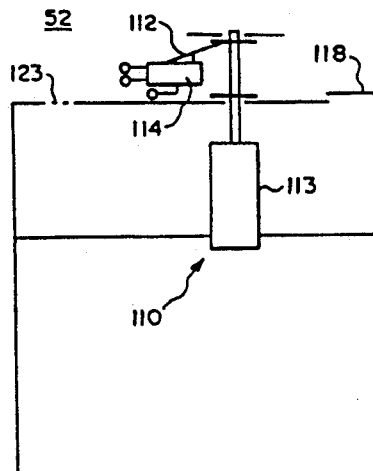
FIG. 8 is a schematic elevational view of a distilled water holding tank, which is a portion of the embodiment of FIG. 4.

In FIG. 8, there is shown a front elevational view of the distilled water holding system 52 (FIGS. 2, 3, and 4) which is shaped as a right regular parallelopiped with one side being 15 inches long, the other side being 11 inches long and the height 10 inches so as to fit underneath the water tank 59 (FIG. 3). It contains a circular lid 118 and a level sensor 110, an outlet port 124, an overflow tube 24E and a filtered vent 123. The lid 118 may be opened to obtain access to the interior. The inlet port 120 interconnects with the conduit 54 to receive distillate from the condenser 50. The sides of the distilled water holding system 52 are formed from stainless steel.

The level sensor 110 consists of a float assembly 113 and a push button switch 114 with an actuating lever 112. The push button switch 114 is chosen to have an operating force—the force needed to be applied at the end of the actuating lever 112 to cause the switch to close—slightly less than the weight of the float assembly 113. The releases force for the switch is much less than the operating force. For efficiency, it is desirable for the water level to be able to fall a distance from full, representing at least 1½ gallons of distilled water before the steam generator 72 is activated. If this represents a vertical drop in the level of a predetermined height, then the actual float geometry must be chosen so that the weight of water displaced over the distance of the predetermined height, is equal to the difference between the operating force and release force of the push button switch 114.

As the level of the distilled water falls, the float assembly 113 remains static while the downward force on the actuating lever 112 increases. The dimensions and weight of the float assembly 113 is such that approximately 1½ gallons of water can be drawn from the full tank before there is sufficient force on the actuating lever 112 to cause the push button switch 114 to close, thus activating the steam generator to distill more water and heat more water for use as hot water. Suitable switches are sold under the trademark "Microswitch" by Microswitch Inc., Dept. 740, Freeport, Ill. 61032, with designation number V3L-3005-D8. Level sensor 110 forms part of the energy controller circuitry 68 (FIG. 2).

To convey distilled water to the drinking water supply system 36 (FIG.2), the outlet port 124 is situated at the base of the tank connecting with conduit 48 (FIG. 2). To permit overflowing of the distilled water holding system 52 in the event of malfunction of the level controller, the top of an overflow tube 24E communicates with the interior of the distilled water holding system 52 at a port 122 and extends downwardly where it communicates with a sewer inlet. The port 122 is positioned approximately ½ inch from the top of the distilled water holding system 52 to avoid uncontrolled overflowing through the filter vent 123.

The overflow port 122 and conduit 24E are plumbed with a sufficient gap between the end of conduit 24E and the maximum water level possible in the sewer drain so that contaminated water from the sewer cannot be forced back into the distilled water holding system 52. The gap in the plumbing is at least 1 inch. A conventional vent for replacement air is provided as shown at 123.

While the distilled water holding system 52 in the preferred embodiment is made from stainless steel, other material of food grade quality can be used and other level detection devices known to the art can be used instead of the float sensor 110. The distilled water holding system 52, except for the float system, is substantially the same as holding tanks sold for air cooled distillers by Pure Water, Inc., Lincoln, Nebr. adapted for the embodiments of this invention and the same size stainless steel holding tanks may be used with minor modifications as described herein.

To remove distilled water on demand, the outlet port 124 is located substantially at the bottom of the container for the distilled water holding system 52 and is connected to the inlet port of a demand pump 125. The outlet port of the demand pump is physically connected through a filter 127 to a conduit 34 and from there to the faucet system or to icemakers or the like indicated schematically at 16 (FIG. 1). The demand pump is available on the market and is a pump in which the opening of a water faucet causes a drop in pressure at the outlet port and automatically activates the pump. Such pumps are sold by Shurflo, Inc., 1400 Cerritos Avenue East, Anaheim, Calif. 92805, and a suitable one is sold under model number 2152-07-982-14. Any suitable filter containing standard granular activated carbon may be used to remove those impurities not removed by distillation.

In the embodiment of FIG. 8, the distilled water holding system 52 has a level sensor 110 but in other embodiments, it does noet need level control but is permitted to simply overflow or run dry depending on the ratio of demand for hot water to demand for distilled water in the system. Under normal conditions, there is more distilled water generated over the course of a day in meeting the hot water demand than can be used. Hence some distilled water will overflow to drain.

In the embodiment of FIG. 8, distilled water is produced and accumulated at times in which there is hot water demand. The holding tank has sufficient capacity so that the water accumulated during hot water demand lasts through those periods when there is small or no demand for hot water but large demand for distilled water.

The energy required to produce distilled water for a household is less than the energy needed to meet their hot water requirements. Hence, the potential exists to recover all of the energy released in condensing distilled water and to use the released energy to help satisfy the hot water demand.

The distilled water holding tank should be sized to hold between two to six days supply of distilled water and preferably 3 days normal demand. For a family of four persons this represents approximately 4 to 12 gallons and preferably 6 gallons capacity and proportionately smaller for smaller households. Generally, it should have a capacity of between 2 and 20 gallons.

The quantity of distilled water that can be drawn down before the steam generator is activated should be approximately one quarter of the total tank capacity or 1½ gallons for a family of four. This ensures ample availability of water for casual guests as well as providing a reserve equivalent to two days consumption.

Figure 9:
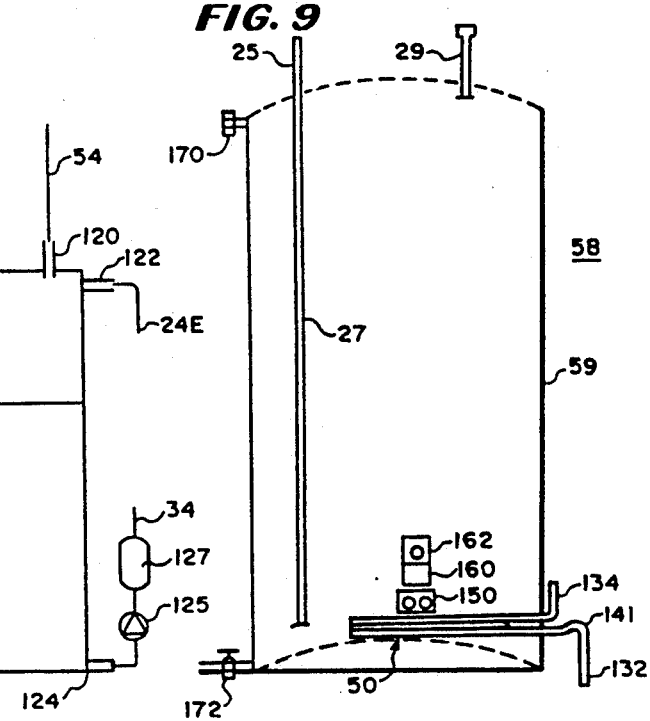
FIG. 9 is a schematic, elevational view of still another portion of the combined hot water heater and distilling system of FIG. 4.

In FIG. 9, there is shown a schematic, elevational view of the heating/condensing system 58, which is generally cylindrical in the manner of standard household hot water tanks. This embodiment includes a suitably modified electric water heater, manufactured by Dayton Electric Manufacturing Co., 5959 West Howard Street, Chicago, Ill. 60648, Model number 3E201J, having a capacity of 42 gallons and containing within it the standard cold water down spout 27 (FIG. 3) extending close to the bottom heating element and thermostat for receiving cold water from the cold water supply at inlet port 25. A hot water outlet 29 is connected to the hot water system by a conduit 44 (FIG. 3). The modifications to the Dayton water heater are an additional element mounting hole 1 inch above and 90 degrees rotated from the lower element fitting.

Generally, the heating/condensing system 58 has a diameter of 1½ feet and a lateral length of 4½ feet, being a mild steel right regular cylinder with a ratio of lateral height to diameter: (1) sufficient to permit bulk flow; (2) capable of maintaining a stable interface between water already at the requested temperature and cold water added during hot water draw down while following operation; and (3) being no greater than 10 to 1. To protect against corrosion, the system is glass lined and is well insulated to minimize heat loss.

To supply heat to the water near the bottom of the heating/condensing system 58, the condenser 50 is positioned where normally there would be a lower heater element and it communicates with steam inlet 74 from the steam generator 72 (FIGS. 4 and 5) and a condensed distillate outlet conduit 54 communicating with the distilled water holding system 52 (FIGS. 4 and 8).

To protect against internal pressure damage or excessive temperatures, a standard temperature and pressure relief valve 170 is mounted near the top of the heating/condensing system 58. To permit draining of the tank, a standard drain valve 172 communicates near the bottom of the heating/condensing system 58. The condenser 50 is mounted within 3 inches of the bottom adjacent to the water inlet tube 27.

To provide heat when the demand for distilled water has been satisfied, there is mounted a standard electrical heating element 150 within 1 inch immediately above and preferably perpendicular to the condensing element 50. Immediately above the element 150 and within 3 inches of it there is mounted, in contact with the side of the heating/condensing system 58, a variable thermostat 160 and a high limit thermostat 162. These components are standard in the industry, and in the preferred embodiment, are manufactured by Dayton Electric Manufacturing Company, 5959 West Howard Street, Chicago, Ill. 60648, with designation 2E679 for the thermostats and 2E499 for the heating element.

The thermostats 160 and 162 are electrically connected to the electronic switch 163 (FIG. 3) in a manner to be described hereinafter in connection with specific circuits. The switching temperature of the thermostat 160 is set to give the desired hot water temperature. The thermostat 162 is factory set at a temperature: (1) sufficiently low to prevent excessively hot water from being drawn from the heater; and (2) higher than thermostat 160. This temperature is typically 180 degrees Fahrenheit.

The closing of thermostat 160 causes the input of heat to begin. Provided there is a demand for distilled water the steam generator 72 will be turned on. Should there be no demand for distilled water, heating element 150 will be energized. Hot water is maintained at the proper temperature using either the distilled water system or element 150.

When the water inside the heating/condensing system 58 requires heating, the thermostat 160 closes. This system causes the energy controller circuitry 68 (FIG. 2), to activate: (1) the steam generator 72 when there is a demand for distilled water; or (2) the heating element 150 when there is no demand for distilled water.

In this manner, provided there is a requirement to produce distilled water, the demand for hot water is always met using the steam generator 72 and condenser 50 as the energy source, thereby making the most efficient use of the energy needed for distilling.

The heater itself is largely conventional and adapted for use in the invention. The novelty is in the adaptations and in its cooperation with the other elements as described in this case.

Figure 10:
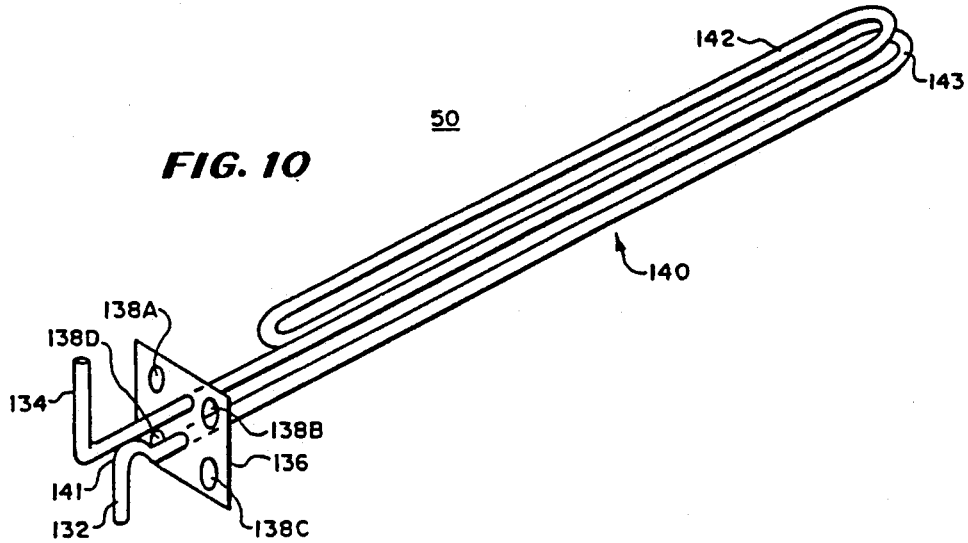
FIG. 10 is an enlarged perspective view of a condenser, which is a portion of the distilling apparatus of FIG. 9.

In FIG. 10, there is shown a perspective view of the condensing element 50 having a bracket 136, tubes 132 and 134 entering the hot water tank 59 (FIG. 4) a set of loops of tubes 140 integrally formed with tubes 132 and 134, and a pressure rise 141 in tube 132. The tubes 132 and 134 are positioned sufficiently close to fit conveniently through a small opening closed by the bracket 136 and the set of loops of tubes 140 has a larger surface area to permit adequate heating within the water heater diameter. For this purpose, the loops are no more than 7 inches apart.

To permit the sealing of the tubes in the water heater, the bracket 136 includes 4 bolt holes 138A, 138B, 138C and 138D adapted to compress the bracket 136 against a gasket to sealingly close the bracket water heater walls. The tubes 132 and 134 also sealingly engage the bracket and pass therethrough, with the tubes 132 and 134 forming two other loops 142 and 143 of the set of loops of tubes 140 in the preferred embodiment. With this arrangement, the condensing element 50 may be easily removed from the water heater to clean it.

The loops 140 contain a sufficient number of lengths to provide ready heat transfer and adequate pressure drop to cause the vapor to be condensed into water in their interior. They have a length no greater than the length of the diameter of the water heater and each length is spaced from the other a sufficient distance to permit convection of water therein between, and at least ⅛ inch. In the preferred embodiment, the tubes are ⅜ inch diameter, stainless steel tubing bent to fold into the four lengths. Preferably, the lengths slope downward to ensure flow of condensate.

For a condensing element to be utilized efficiently and effectively as the primary source of heat for a water heater, it must: (1) be located close to the base of the heater tank; (2) be surrounded by the water to be heated; (3) have the correct surface area and pressure drop to give good condensing and cooling; (4) have the correct geometric shape to give optimum cooling of the condensate; (5) produce hot water with a controlled maximum temperature; and (6) be able to be removed easily for cleaning and/or replacement.

The condensing element 50 is designed to either replace the existing electric heating element which has been located close to the base or to be located near it. In one embodiment, it is made from 0.375 inches outside diameter stainless steel tubing having a wall thickness of 0.028 inches. The internal surface area is approximately 1 square inch per inch of length. Its actual length is 65 inches and it provides a surface area of 65 square inches for condensing and cooling. The pressure drop through it must be at least ½ inch of water gage for proper condensation and should be no more than 450 inches of water for economy. In the preferred embodiment, it is 4 inches of water gage when condensing 1,500 watts.

The foldback type element is installed with the first half of the tubing being horizontal and the second half horizontal but displaced vertically below the first half. This insures that the coldest water is available for cooling. The condensing element 50 can be removed readily for cleaning as required. The outside surface can be coated with Teflon (a trademark of DuPont Corporation for polyfluoroethylene) (silverstone) or coated with a similar material that will minimize fouling.

In general, the condenser 50 should have an outside surface area: (1) of 1 square inch of tube surface area for every 15 to 30 watts of power used in the steam generator; and (2) in the range of between 25 and 200 square inches. The tubes should have: (1) a wall thickness of between one-tenth of an inch and ten thousandths of an inch; and (2) a total tube length of between 25 and 150 inches. The actual dimensions are selected to provide the proper: (1) pressure drop; (2) time within the tubes for the steam; (3) heat transfer characteristics; and (4) condensing area to give efficient condensing and cooling based upon the energy input and the material heat transfer characteristic.

To increase transit time for condensate in the condenser 50, and make maximum use of the available surface for heat transfer a weir or other obstruction 141 is included. The weir 141 is: (1) lower at its uppermost inner wall than the upper inner wall of the top set of loops 142 so that water in the top set of loops 142 may flow freely out of tube 132 by gravity; (2) raised by at least one diameter; and (3) its lower inner wall is higher than the top of the inner wall of the lowest run in bottom set of loops 143 to accumulate water in the bottom run. Preferably, it is positioned to only hold water in the lower tube of the lower set loops 143. Of course, the weir 141 could be located on the inside of the bracket 136.

The flange on the condenser 50 can be made in a number of forms to be compatible with methods used by various water heater manufacturers for mounting and sealing electric heating elements in their water heater tanks so that the condenser 50 can be used as a direct electric element replacement in any such water heater for certain embodiments of this invention.

Figure 11:
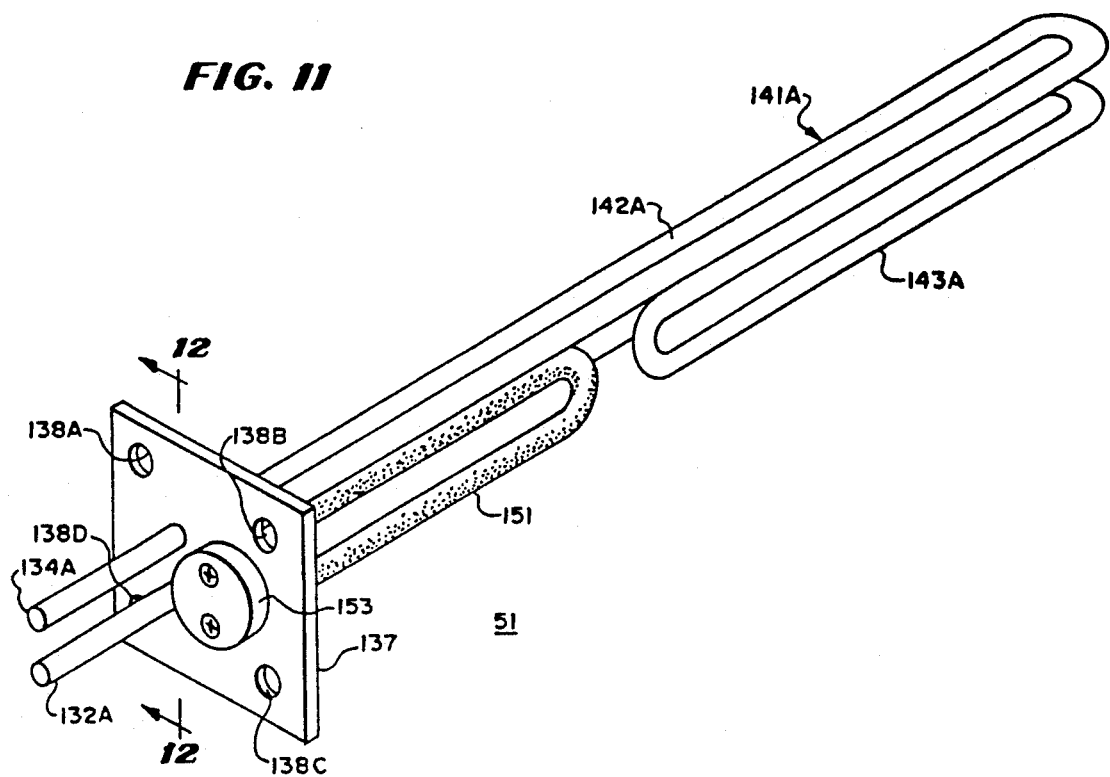
FIG. 11 is an enlarged perspective view of a portion of another embodiment of the distilling apparatus of FIG. 8.

In FIG. 11, there is shown a combined condenser and electric heating element 51 consisting of condensing tubular bundles 141 and an electric element 151 interconnected through a common flange 137 which is similar to the conventional flange for the lower heater in many electric water heaters. This flange includes a plate accomodating an upper inlet pipe 134A and a lower outlet pipe 132A as well as insulated terminals 153 for the electrical element 151. It is mounted by bolts passing through the four bolt holes 138A–138D. The condenser pipe includes a section of loops, the upper loop being 142A and the lower loop 143A.

The flange 137 has bolt holes no further from the center of the plate than 3 inches and, in the preferred embodiment, the plate is 2½ inches wide by 2½ inches high and the bolt holes are ⅜ inch from the sides at each of the four corners. In the preferred embodiment, the apertures for receiving the pipe inlet and outlet 134A and 132 and the element 151 all fall within a circle which, in the preferred embodiment, has a radius of 9/16 inch and should be within a radius of ¼ inch to 2 inches.

To provide sufficient surfaces for the condenser 51, the upper loop 142A includes first and second interconnected portions parallel to each other with the second interconnected portion extending from the distal end of the first and returning in a horizontal plane half the length of the first section, at which point it contains a vertical section interconnected to the second loop 143A. The second loop 143A includes a pipe extending from the mid-section of the first pipe of the loop 142A to its distal end and a horizontal section extending directly under the first section and a second horizontal section returning to the outlet 132A in a plane vertically under the first section of the first loop 142A and parallel to the other sections of pipe in the bottom loop 143A. The electrical element 151 contains two lengths parallel to each other, one vertically under the other and both being in a plane parallel to the first section of pipe and the last sections of pipe of the loops 142A and 143A, respectively, and in a plane aligned with the second pipe of the loop 142A and the first section of the loop 143A.

Figure 12:
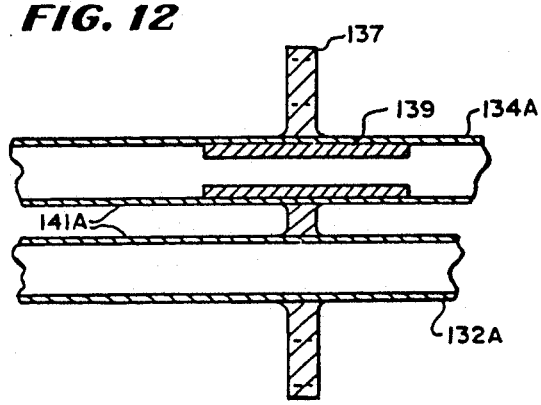
FIG. 12 is a fragmentary sectional view of a portion of the embodiment of FIG. 11 taken through lines 12—12.

In FIG. 12 is shown an embodiment of the heating elements of FIG. 11 with an internal insulating sleeve 139. When the electric element 151 of the combined condenser and electric heating element 51 is used to provide energy for heating water, all of the heat energy from the element is absorbed by the water. The first inch or so of the element inside the flange contains a low resistance conductor and little heat is generated in this area. It is the heat flowing from the water through the wall of the water heater that will cause the variable thermostat 160 (FIG. 9) to open.

When the steam condenser 141 (FIG. 11) of heating element 51 is used as the source of energy for water heating, steam will condense inside conduit 134A (FIG. 11). While insulating the outside of the conduit will minimize losses, the metal to metal connection between the conduit 134 and the mounting flange 137 will provide a good heat path so that some energy will flow from the conduit into the flange and from the flange into the outside of the water heater tank. This path can result in the temperature at thermostat 160 being established not only by the temperature of water inside the tank but also by the heat escaping from the conduit-to-flange contact. The thermostat will open and stop energy input to the water heater at a lower water temperature. The insulation is one method for interrupting this heat path and preventing false turn-off of energy input.

Figure 13:
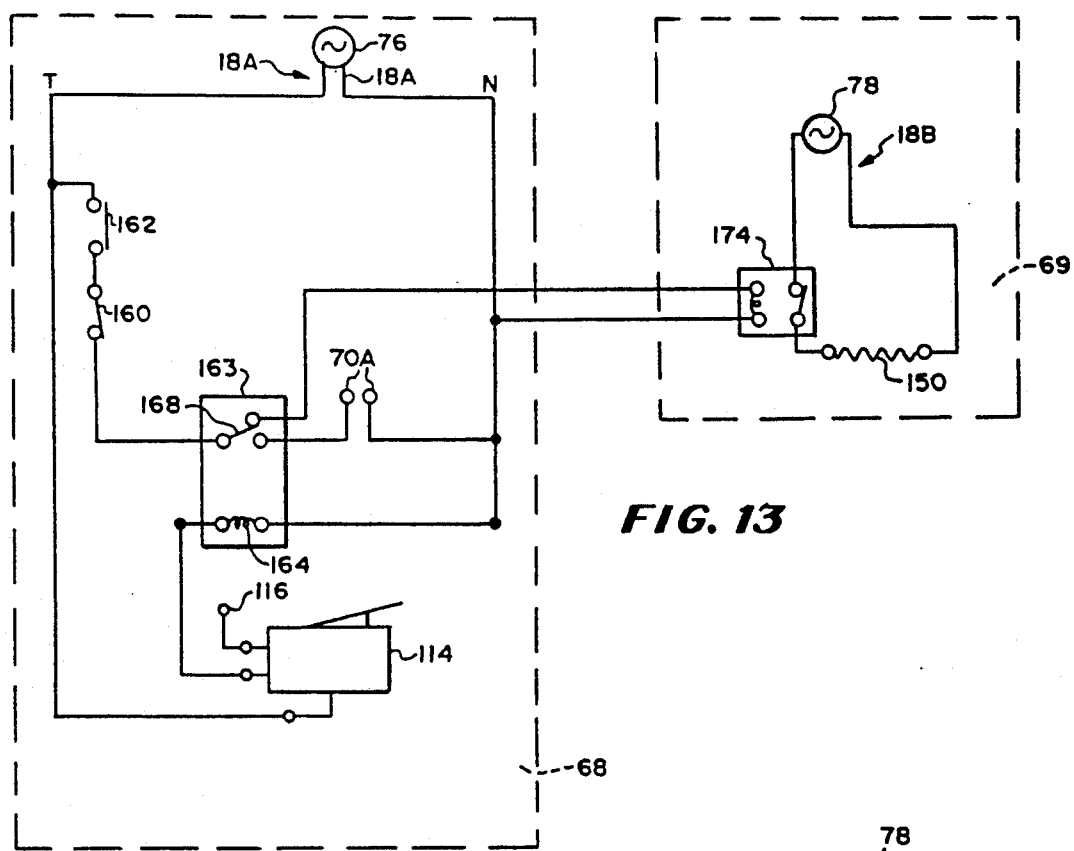
FIG. 13 is a schematic circuit diagram of an energy control circuit and a secondary heating circuit useful in the embodiments of FIG. 3.

In FIG. 13, there is shown a schematic circuit diagram of energy controller circuitry 68 and a secondary heating circuit 69 which circuits may be utilized to: (1) receive 120 volt AC power from the primary energy source 76 (FIG. 2), 240 volt AC power from the secondary energy source 78 (FIG. 2); (2) apply 120 volt AC power through conductors 70A to the steam generator 72 (FIG. 2); (3) apply 120 volt AC power through conductor 116 to the bimetal disk temperature control 95 (FIG. 6); and (4) apply 240 volt power to the heating/condensing system 58 (FIG. 2) through conductors 18B.

To accomplish the above purposes, the energy controller circuitry 68 includes the variable and high limit thermostats 160 and 162, the push-button switch 114 and a solenoid-operated switch 163. The secondary heating circuitry 69 includes for this purpose the electrical heater element 150 and a solenoid operated switch 174. The heating element 150 is electrically connected to the secondary energy source of 240 volts AC 78 through the solenoid-operated switch 174.

To apply power through conductors 70A to the steam generator 72 (FIGS. 2 and 5), a first of the conductors 70A is electrically connected to the primary energy source 76 and the second conductor is electrically connectable through the single-pole, double-throw relay switch 163 to the primary energy source 76 through armature 168 of relay switch 163, the variable thermostat 160 and the high limit thermostat 162 so that when solenoid coil 164 of the solenoid relay switch 163 is energized, the coil of solenoid switch 174 is de-energized and the contacts of solenoid switch 174 are opened. The steam generator 72 is energized by the application of power through conductors 70A.

The relay switch 163 is energized by the push-button switch 114 closing when the float assembly 113 (FIG. 8) indicates that water has dropped to a predetermined level and is de-energized at a higher level by the opening of push-button switch 114 (FIG. 8) when the float rises close to the overflow port 122, thus creating one condition for energization within a range of levels of distilled water within the distilled water holding system 52.

To cause energization of the relay switch 163, the solenoid coil 164 is electrically connected at one end to the primary energy source 76 and at its other end through push-button switch 114 so that when the water level has dropped sufficiently low, coil 164 is energized. When water level rises high enough, push-button switch 114 opens, de-energizing the coil 164 and causing armature 168 to adopt its normally open position so that the relay 163 only becomes energized when the water level has fallen a predetermined distance below full level in the distilled water holding system 52.

Output power for the steam generator 72 is provided at 70A and is connected according to the circuit diagram shown in FIG. 7. This results in steam being produced and passing into condenser 50 where it condenses. The distilled water so produced flows into the distilled water holding system 52 (FIG. 4). The energy of condensation and cooling passes into the water surrounding the condenser 50 which then is displaced by cooler water with the hotter water rising. Secondary power of 240 volts AC is connected to 18B for use by the electric heating element 150 when there is demand for hot water but not for distilled water.

Demand for hot water is indicated by thermostat 160 being closed. Demand for distilled water is indicated when the level in the distilled water holding system 52 falls below the level at which push-button switch 114 is closed. This is approximately 1½ gallons below the level at which push-button switch 114 opens to indicate that distilled water demand has been satisfied and that steam generator 72 is to shut down. Once the demand for distilled water has been satisfied, approximately 1½ gallons can be used before the system indicates a new demand.

In operation, the water level in the distilled water holding system 52 (FIG. 8) falls to a level due to the use of distilled water that closes the push-button switch 114. This energizes coil 164 in the single-pole, double-throw relay 163 resulting in switch armature 166 adopting the normally open position.

When there is a need for heat to raise the temperature of the water inside the heating/condensing system 58 to its desired level, thermostat 160 closes. Electric power is then supplied through cable 70A to the steam generator 72 (FIG. 5). Distillation proceeds with distilled water being collected in the distilled water holding system 52 and the temperature of the water in the heating/condensing system 58 increases. Distillation continues until either the distilled water demand is satisfied or the hot water demand is satisfied.

When there is no demand for distilled water, the relay coil 164 is de-energized and armature 168 adopts the normally closed position. Armature 168 then directs power to the switch 174 closing its contacts. Any demand for hot water is then serviced from the secondary energy source 78 through cable 18B and heating element 150 (FIGS. 2, 4 and 9).

The drain valve 94 of the steam generator 72 is connected by conductor 116 (FIG. 7) so that as long as there is a demand for distilled water, the drain valve is closed. When demand has been satisfied, power is directed to the bimetal disc temperature controller 95 (FIG. 7). Additional water is added to lower the temperature inside the evaporator tank 80 and then the drain valve is opened to drain the contents of the evaporator tank 80 (FIG. 5) to the sewer, thereby removing water with higher concentration of impurities due to the distillation process. By such regular draining, concentrations are kept low and scaling inside the evaporator tank 80 is minimized.

Adjustable thermostat 160 together with high limit thermostat 162 are mounted as a single unit immediately above the electric heating element 150. Such a unit is available from Dayton Electric Manufacturing Company, 5959 West Howard Street, Chicago, Ill. 60648, with designation 2E679. Heating element 150 is a standard 4,500 watt, 240 volt AC heating element. A suitable type is available from the above company with designation 2E499.

A suitable single-pole, double-throw relay 163 is made by Omron Electronics, Inc., One East Commerce Drive, Schaumburg, Ill. 60195, with designation G4B-112T-C-USAC-120. A suitable solenoid operated switch 174 is made by Durakool, Inc., 1010 North Main Street, Elkhart, Ind. 46515, with designation BFL-7032.

Differential level control of the distilled water holding tank can alternatively be achieved by using level probes and a suitable controller. The float assembly 113, and push button switch 114 (FIG. 8) are replaced by two level probes mounted so that the high level probe contacts the water when the water has reached full level, whereas the low level probe is mounted so it breaks contact with the water when the distillation process needs to restart.

A controller is electrically connected to these probes and the metal tank. The controller will switch power to either the solenoid switch 174 or the steam generator cables 70A and provide power to bimetallic disc temperature control cable 116 in FIG. 11 in essence doing the same task as push switch 114, and relay 163. A suitable controller is manufactured by Warwick Controls Inc., 1964 West Eleven Mile Road, Berkley, Mich. 48072 with designation 16S1BO-00-00.

If a single source of electric power is preferred to supply energy to both the evaporator tank heating element 98 (FIG. 5) and the lower heating element 150 (FIG. 9), then solenoid switch 174 can be discarded and the cables from the energy control circuitry 68 connected directly across heating element 150 (FIG. 9).

The primary energy source 76 now supplies energy to either the evaporator tank heating element 98 (FIG. 5) through cables 70A or lower heating element 150, and there is no secondary energy source 78. The primary energy source 76 can be 120 volts AC, 240 volts AC or any appropriate voltage. Components must be chosen with the correct capability for the voltage to be used.

Figure 14:
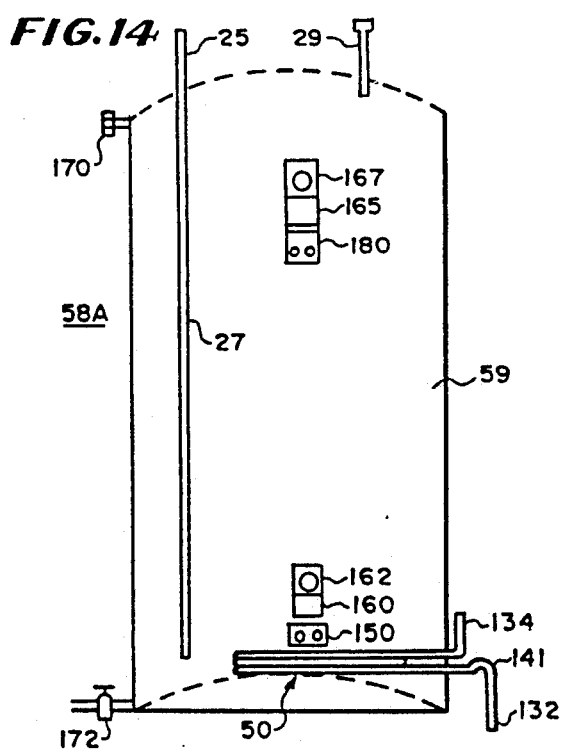
FIG. 14 is an elevational view of another embodiment of the invention.
Figure 15:
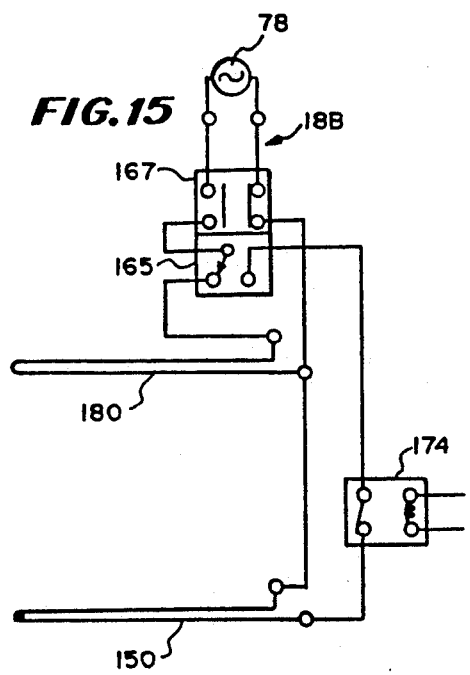
FIG. 15 is a schematic diagram of a secondary heating circuit useful in the embodiment of FIG. 14.

In FIGS. 14 and 15, there is shown an elevational view and a schematic circuit diagram of an embodiment of hot water heater similar to the embodiments of FIGS. 9 and 13 in which the heating/condensing system 58A has an additional heating element 180 added approximately ⅓ down from the top of the tank. A further variable thermostat 165 and high-limit thermostat 167 are added immediately above the electric heating element 180.

The variable thermostat 165 is of a more complex nature than the one deployed above the lower element 150. It has an additional contact so that when the preset temperature is reached, power is removed from one contact and made available at the additional contact. A suitable type of unit combining the variable thermostat 165 and the high-limit thermostat 167 is made by Dayton Electric Manufacturing Company, 5959 West Howard Street, Chicago, Ill. 60648, with designation 2E680.

The upper element 180 is added to improve rate of recovery from high hot water demand. It is common in electric water heaters with capacities of over 20 gallons and almost universal with larger units. Should the temperature at variable thermostat 165 fall below set point, the high-limit thermostat 167 closes and supplies power to the upper element 180 and the lower element 150 is isolated. Once the temperature at the top of the tank reaches set point, variable thermostat 165 switches power to the lower element. Except in cases of extreme demand for hot water, the upper element 180 is not used.

The arrangement of heating elements 150 and 180 together with high-limit thermostat 167 and variable thermostat 165 are typical for two element electric water heaters. The novelty is in the replacement of a direct operating variable lower thermostat by a variable thermostat that indirectly operates solenoid switch 174.

If preferred, energy control circuitry 68 (FIG. 13) and secondary heating circuit (FIG. 15) can both be supplied from a single source of electricity such as 240 volts AC. To keep within the wiring specifications for supply to standard two element electric water heaters and maintain maximum recovery, it becomes necessary to modify logic so that no more than one electric heating element can be energized at any one time whether it be the upper heating element 180, lower heating element 150, or the evaporating tank heating element 98 (FIG. 5). The need for the lower over temperature thermostat 162 then disappears as top over temperature thermostat 167 when opened will remove power from all heating elements including the steam generator 72 (FIG. 5).

In FIG. 16 there is shown the preferred embodiment for domestic combined hot water and distilled water system 12 (FIG. 1). The steam generator 72 is mounted on top of the distilled water holding system 52 to form a distiller unit 73 that can sit along side the water heater 58A. It could also sit below the water heater 58A if space was at a premium.

Combined condenser and electric heating element 51 containing both the electric element 151 and condensing loops 141A (FIG. 11) is installed in place of the conventional electric heating element 150 (FIG. 4).

A distiller control box 155 is mounted on top of the heating/condensing system 58A.

In FIG. 17 there is shown a circuit diagram useful in the embodiment of FIG. 16. It is designed to operate off the 240 volt power supply for a conventional two element electric water heater.

Control box 155 is designed to receive the 240 volt cable 18, be a termination point for the internal wiring of the water heater, and contain a female outlet to provide power to the distiller 73 (FIG. 16) and receive signals from level sensor 110. Relay 163 is mounted in the control box 155 so that when plug 157B is removed from the control box 155, the water heater will operate conventionally. Hence, any operational problem with the distiller will not jeopardize normal hot water capacity.

Operation of the system is similar to that described for FIGS. 13, 14 and 15 except the three electric heating elements 180, 151 and 98 are supplied from a single source of 240 volt power. When top element 180 is activated, power is unavailable for either the lower electric element 151 or the steam generator electric element 98.

Electric element 151 should be as large as practicable but not exceeding 4500 watts. In the preferred embodiment it is 2500 watts.

The circuit for the steam generator, shown generally as 72 in FIG. 17, is identical to that shown in FIG. 7 and described earlier. Similarly, the control circuit using level sensor 110 and relay 163 is identical in operation to that shown in FIG. 13 generally as 68. The circuit for water heater control, shown generally as 58A, is similar to that of FIG. 15 and described earlier.

Switch 121 is used to isolate demand pump 125 at start-up when there is no water in the holding system 52. Switch 129 is used to turn the distiller off and allow the water heater to operate conventionally. It can be used for instance when the distiller is shut down to inspect and possibly clean the steam generator 72. The demand pump will be able to continue to operate on demand during such times.

Figure 18:
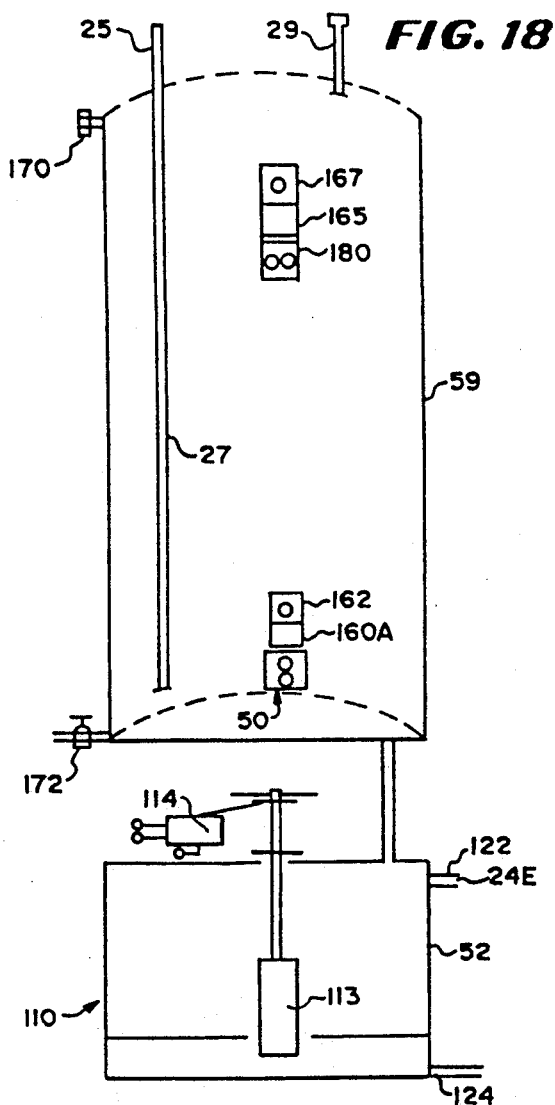
FIG. 18 is a schematic diagram of still another embodiment of the invention.

In FIG. 18 there is shown an elevational view of an embodiment of hot water heater and still including a simplified version of the hot water heater of FIG. 14 in which the heating/condensing system 58 does not have a lower electric heating element 150 (FIG. 14). The condensing element 50 directly replaces the lower heating element in a standard two element electric water heater.

Variable thermostat 160A is identical to the top variable thermostat 165 having an additional contact, so that when the preset temperature is reached, power is removed from one contact and made available at the additional contact. A suitable type of unit combining the variable thermostat 160A and high-limit thermostat 162 is made by Dayton Electric Manufacturing Company, 5959 West Howard Street, Chicago, Ill. 60648, under the designation 2E680.

The distilled water holding system 52 is similar to that shown in FIG. 8 except the float assembly 113 is set much lower in the tank so that push button switch 114 closes when the water level has fallen to the minimum desirable quantity of distilled water in the holding system. A solenoid actuated hot water dump valve 181 is installed in the hot water line 44 (FIG. 4) downstream of the water heater so that, when it is activated, hot water is released to sewer.

Figure 19:
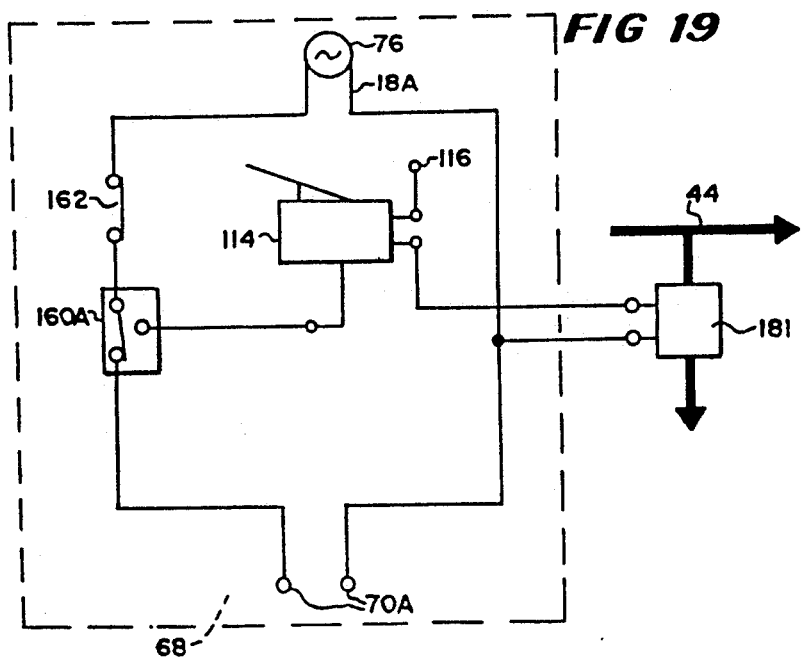
FIG. 19 is a schematic circuit diagram of an energy control circuit useful in the embodiment of FIG. 18.

In FIG. 19, there is shown an energy controller 68 for the embodiment of FIG. 18 having a hot water dump valve 181, push switch 114, a variable thermostat 160A, a high limit thermostat 162, a source of primary energy 76, terminal 70A and conductor 116.

Conductor 116 is connected to the bimetal disc temperature controller 95 (FIGS. 6 and 7) to first add cold water and then drain the liquid from the steam generator as described in connection with FIGS. 6 and 7. The common contact of thermostat 160A is connected through high limit thermostat 162 to the source of primary energy. The low temperature contact is connected to terminal 70A. The high temperature contact of thermostat 160A is connected to the common contact of push switch 114 while the normally open contact is connected to the solenoid of the hot water dump valve 181. The normally closed contact of push switch 114 is connected to conductor 116.

In operation, when variable thermostat 160A closes, power is directed from terminals 70A of the energy controller 68 (FIG. 2) to the steam generator 72 (FIG. 2). Distilled water is produced and the temperature of water in the heating/condensing system 58 is raised until the preset temperature is reached and thermostat 160A opens. This provides power to push switch 114.

If push switch 114 is closed, thus indicating less than the required level in the distilled water holding system 52, the hot water dump valve 181 opens and hot water is dumped to drain until cold water entering the heater/condenser system 58 causes thermostat 160A to close, reapplying power to the steam generator 72 through conductors 70A.

When the level in the distilled water holding system 52 is above the minimum level, push button switch 114 is open. When the preset temperature is reached in the heating/condensing system 58, variable thermostat 160A will open applying power to the push button switch 114. Because it is open, power is not applied to the hot water dump valve 181. However, power will be applied to conductor 116 initialing draining of the evaporator tank 80 (FIGS. 5 and 6). Secondary heating circuit 69 (FIG. 20) is totally independent of energy controller circuitry 68. It is activated only when heavy demand is made on the hot water system.

This approach is attractive when the energy requirements to produce distilled water approximately equal the energy requirements to meet hot water demand. If hot water demand exceeds distilled water usage, excess distilled water will be overflowed to drain. If distilled water usage exceeds normal hot water usage, hot water will be dumped to drain in order to meet the distilled water demand.

The hot water dump valve 181 may be any solenoid valve operable automatically in response to a signal from the energy controller circuitry 68 (FIG. 3) to pass hot water to sewer until the signal is terminated. A suitable valve is sold by Eaton Manufacturing Corporation, Controls Division, 191 East Wall Avenue, Carol Stream, Ill. 60188, under the designation 30-PAM-120. The secondary heating circuit 69 (FIG. 20) includes the secondary energy source 78 (FIG. 2), the variable thermostat 165, the high-level thermostat 167 and the upper heater element 180. With this circuit, the upper heating element is energized to supply short term hot water demand as described in connection with FIG. 15.

In FIG. 21, there is shown another embodiment of combination still and hot water system having a preheating/condensing system 232, a distilled water holding system 52, and a hot water heater 234. The energy from condensing steam and cooling distillate supplies heat to the preheater tank 235, and the preheater tank 235 supplies water to the water heater 234 which provides hot water for use in the home, apartment building, hotel or other building.

The combination still and hot water system is similar to that in FIG. 3 except that: (1) a preheater tank 235 is used which is similar to the hot water heater 59 (FIGS. 3 and 4) except smaller in size but it is supplied with heat in a like manner by steam from a steam generator and receives cold water as hot water is used; (2) the preheating/condensing system 232 does not communicate directly with the hot water system but instead communicates with the hot water heater 234 to supply water to it, and the hot water heater 234 does not communicate with the steam generator nor the distilled water holding system 52; (3) the hot water heater 234 operates normally even though it may be a gas hot water heater or the like; and (4) the preheater tank 235 contains no secondary method of heating.

The steam generator 72 supplies heat to the preheating/condensing system 232 only when there is a demand for distilled water and when the temperature of the water in the preheater tank 235 is below its preset valve.

To directly supply hot water, the hot water heater 234 communicates at its upper end with the hot water supply system 46 (FIG. 2) through a conduit 44A and receives water from the preheat tank 232 through a conduit 236 which communicates with a downspout 239 that extends to a lower location near the internal heater within the hot water heater 234. This heater may include an upper heater and thermostat and a lower heater and thermostat to operate normally to supply long-term hot water demand as well as short-term demand. In either case, as water is drawn through the conduit 44A by users of hot water, new water flows under pressure from within the preheater tank 235 into the hot water heater 234 to replace the water that has been removed.

To supply heated water from the preheater tank 235 to the hot water tank 234 through the conduit 236, the preheater tank 235 communicates with the conduit 236 near its upper end so that pressure forces fluid into the hot water heater 234. As water is drawn from the preheater tank 235, cold water from the cold water supply flows into the preheater tank 235 through a conduit 22 to replace the lost water in a manner normal in conventional water heaters.

The preheating/condensing system 232 includes a high-limit thermostat 162, variable thermostat 160, a preheater tank 235, and a condenser 50. The condensor 50 receives steam from the evaporator and supplies distilled water to the holding tank in the same manner as the embodiment of FIG. 4, but supplies heat through the condensor 50 to the preheater tank 235 rather than the hot water tank 234 and the cold water pipe extends downwardly to a location adjacent to those elements so that, as water is drawn from the preheater tank 235 through the conduit 236, cold water flows to a location near the bottom to be heated by the condenser 50 and rise.

The steam generator and controls are like those shown in FIGS. 5, 6 and 7 and the distilled water holding system 52 is like that shown in FIG. 8. The energy controller circuitry 68 is the same as that shown in FIG. 13 except there is no secondary heating circuit 69.

In operation variable thermostat 160 is set to a similar value to the value set on the water heater 234. Operation is like that described for FIGS. 9 and 13 except there is no secondary heating element 150. Hence, the steam generator is only activated when there is demand for distilled water and preheater thermostat 160 is closed. During and subsequent to the operation of the steam generator water passing out of the preheater tank 235 to the water heater 234 through conduit 236 to replace hot water drawn through conduit 44A is higher in temperature than the cold water flowing through conduit 22 and hence requires less energy input in the water heater 234 to bring it up to the desired hot water temperature.

Should there be no demand for distilled water no heat energy will be input in the preheater tank 235 and the temperature of water entering the water heater 234 will be the same as in conduit 22. Should there be no draw off of hot water but a large draw down of distilled water the temperature of water in preheater tank 235 will rise and cause variable thermostat 160 to open removing power from the steam generator.

If the distilled water demand has not been satisfied the steam generator 72 will be energized when thermostat 160 again closes as a result of either the draw off of water through conduit 44A or cooling due to heat losses, or a combination of both. To reduce heat loss, preheater tank 235 and conduit 236 should be well insulated.

In FIG. 22, there is shown a simple embodiment of combined still and hot water heater suitable for recreational vehicles or cabins or the like. The steam generator 72A is a right cylinder of approximately 7 inches diameter by 8 inches high having a flat base and a removable lid that can seal to contain steam.

A flexible conduit 74A connects the steam generator 72A to the condenser 50. The steam generator contains a high-limit thermostat 90 and electric heating element 98. It contains no form of level control or drain mechanism. Water heater 59 is a standard 10-gallon electric water heater of a type made by Dayton Electric Manufacturing Company, 5959 W. Howard Street, Chicago, Ill. 60641, with designation 3E110J. The condenser 50 replaces the heating element in the water heater. Distilled water is collected in the glass container 53.

In FIG. 23, there is shown a schematic circuit diagram of an energy control system for controlling the combined still and hot water heater of FIG. 22 having a timer 169, a push button switch 167, a relay 251, a variable thermostat 160, first and second high-limit thermostats 162 and 90. The relay 251 includes first and second normally open switches 250 and 252 and relay coil 254. This circuit is similar to prior embodiments but specifically intended for use in recreational vehicles.

In this operation of the embodiment of FIG. 23, steam generator 72A (FIG. 22) is removed by uncoupling the lid and if necessary unplugging an electrical cord. Any residual matter from previous distillation cycles is emptied and the container rinsed and filled with cold water to a level approximately 1½ inches below the top. The lid is replaced and tightened in place. Switch 167 is momentarily depressed to start the process.

When switch 167 is depressed, provided the temperature of water in the water heater 59 is below set point, the coil of relay 251 is energized causing both switches to close. This starts the timer 169 so when the push switch 167 is released the coil remains energized. The second relay switch 168 puts power to the heating element 98 and to the light 256 to show distillation has commenced.

Timer 169 acts as a closed switch when power is first applied and commences to time. Provided power remains connected to the timer, it turns off and becomes an open switch once the predetermined set time has elapsed. This is set to correspond with the time needed to evaporate water down to within ½ inch of the top of heating element 98.

If water in the water heater reaches the preset temperature on the variable thermostat 160: (1) it opens, removing power from the relay coil and opening both switches; (2) timer 169 resets to zero; (3) the heating element is de-energized; and (4) the distilling light goes out. When the variable thermostat 160 closes again, the system does not restart. Hence distillation is terminated either by the timer timing out or the water temperature reaching the preset value. In certain other combined stills and hot water heaters, distillation is started only when both the level of drinking water and the temperature of the water in the preheater are low. A suitable double-pole, single throw relay is made by Omron Electronics, Inc., One East Commerce Drive, Schaumberg, Ill. 60195 with designation 65D-22423T-USAC-120.

While the source of energy in FIG. 22 has been described as electrical, gas could equally well be used in which case the steam generator would not have an electric element installed but rather it would sit on a conventional gas ring. High limit thermostat 90 is positioned to provide protection against the steam generator boiling dry. The electric power previously supplied to the heating element would be wired to a solenoid valve on the gas supply line so that when the momentary switch 167 was depressed, gas would be turned on to the burner. Either the timer 169 timing out and opening or the variable solenoid 160 opening would shut the gas supply down.

In the operation of each of the embodiments disclosed herein, both distilled water for drinking purposes and hot water are prepared, with the distiller supplying heat to a hot water heater to conserve energy. In each case, drinking water may be drawn independently from the use of hot water but a relationship is provided for conserving energy.

In the embodiment of FIG. 4, as hot water is drawn for normal use in the hot water supply system 46 (FIG. 2) such as by turning on hot water faucets 14 (FIG. 1), cold water is supplied through conduit 22A from the cold water system to fill the hot water tank 59 (FIGS. 3 and 4). This water flows downwardly through a spout to near the bottom of the hot water tank 59 which is positioned just above the distilled water holding system 52.

As the cold water flows down to the bottom of the hot water tank 59, it cools the variable thermostat 160 which is located near the condensing element 50. When the temperature as measured by the variable thermostat 160 falls below a preset temperature, the variable thermostat 160 supplies a signal to energize either the evaporator tank heating element 98 or the secondary heating element 150 (FIG. 4).

If the level sensor 110 indicates the level in the distilled water holding system 52 has fallen below the predetermined start level, the evaporator tank heating element 98 (FIG. 4) is energized. This causes water in the evaporating tank 80 (FIGS. 4 and 5) to form steam and rise in the normal manner of a household still to the steam outlet port 82 (FIGS. 4 and 5) where it flows through the steam conduit 74 and is condensed in the condenser 50 within the hot water tank 59.

After being condensed, the distillate flows through the conduit 54 to the inlet port 120 in the distilled water holding system 52. As it flows through the condenser 50 (FIG. 10), it flows along an upper loop length and back through a bent section of the same length 142 spaced to the side and downwardly a sufficient distance to permit convection and from there to another length extending back to the distillate end of the coil through a length 143 again spaced a sufficient distance to permit convection between the lengths and finally back to the conduit 54.

In the preferred embodiment, there are four lengths of tubing in the condenser element. The number of lengths and surface area are selected to condense steam within the condenser at the temperature at which the variable thermostat 160 opens while providing sufficient back pressure to hold the vapor for a long enough residence time within the condenser to form water that will flow to the distilled water holding tank.

When someone draws distilled water from a distilled water faucet 16 (FIG. 1) to drink, the pressure drop from the opening of the faucet causes the demand pump to start up and pump the distilled water through a suitable granular activated carbon filter. The flow of water through the granulated activated carbon filter removes those impurities not normally removed by distillation.

When the level in the distilled water holding system 52 (FIG. 4) as sensed by the level sensor 110 reaches a level approximately 1 inch from the top of the tank, the energy controller circuitry 68 (FIGS. 2 and 13) switches off the evaporator tank heating element 98 (FIGS. 4 and 5) and energizes the lower heating element 150 (FIGS. 4 and 13).

The energy control circuitry 68 (FIG. 13) then meets any demand for energy to heat undistilled water by energizing the lower heating element 150 (FIGS. 4 and 13). Once approximately 1½ gallons of distilled water has been drawn from the tank, coil 164 of relay 163 (FIG. 13 is energized closing armature 168 so any subsequent demand for water heating as indicated by variable thermostat 160 (FIGS. 4 and 13) closing is met by the steam generator 72 (FIG. 4) and condenser 50. In this way, provided there is a requirement for distilled water, a demand for heating undistilled water will always be met by the steam generator 72 (FIG. 4).

The preferred embodiment of combined hot water and distilled water system 12 (FIG. 1) is shown in FIG. 16. The steam generator 72 sits on top of the distilled water holding system 52 forming a distiller unit shown generally as 73 and is located adjacent to a conventional two element electric water heater 59. The lower heating element has been replaced by the combined condenser and electric heating element 51 (FIG. 11). Control circuitry and logic are as shown in FIG. 17.

A distiller control box 155 (FIGS. 16 and 17) is designed to receive 240 volts AC; be a termination power for the internal wiring of the water heater; contain relay 163 (FIG. 17), and contain a female outlet to provide power to the steam generator 72 and receive signals from the distilled water holding system level sensor 110. A suitable cable and compatible male plug connects the distiller control box 155 to the distiller unit 73.

The internal wiring of the water heater is modified so that lower thermostat 160 closing provides electrical power to the common terminal of relay 163. When there is a demand for distilled water as sensed by level sensor 110, coil 164 of relay 163 is energized. Armature 168 will adopt the normally open position and 240 volt AC power will be supplied to steam generator 72. When distilled water demand is satisfied, coil 164 will become deenergized and armature 164 adopts the normally closed position switching electric power to electric element 151 of the combined condenser and electric heating element 51 (FIGS. 14 and 16).

When the distiller is turned off by opening switch 129 (FIG. 17) or when the distiller cord is unplugged from the distiller control box 155, the water heater will operate conventionally.

The advantage of the combined condenser and electric heating element 51 (FIG. 11) is that it permits a distiller unit 73 (FIG. 16) to be combined with a conventional electric water heater to give good energy utilization.

In the embodiment of FIG. 14, if an excessive amount of hot water is used in a short time period, there is some danger that neither the condensing element 50 nor the secondary heating element 150 will supply energy rapidly enough and the water will tend to cool at the outlet 29 where it is supplied to the user. Should this happen, the temperature will drop at the thermostat 165 (FIG. 14), which is set to be activated at a similar temperature to thermostat 160.

When the thermostat 165 is activated, the upper heating element 180 (FIGS. 14 and 15) generates heat at a level of 4500 watts to quickly heat the layer of water immediately adjacent to the outlet 29 for the hot water and thus speeds up recovery by heating only a limited amount of the water in the hot water tank 59 (FIG. 14).

In the embodiment of FIG. 18, the only heating device in the base of the hot water tank 59 is the condenser 50. Hence, whenever thermostat 160A closes indicating a need for water heating, the evaporated heating element 98 (FIG. 5) is energized and distilled water produced.

If substantial hot water is demanded, a considerable amount of distilled water may flow into the distilled water holding system 52 (FIG. 8). If this occurs during a sufficiently long time period where distilled water is not used, the water level may rise to a location where it is close to the vent 123 (FIG. 8) and uncontrolled overflowing through this vent might occur. However, just below this point, there is an outlet port in an overflow down spout 122 (FIG. 8) leading to a sewer so that the distilled water will overflow to drain. The holding tank is selected to be of a sufficient size to accommodate the normal amount of distilled water generated during the time period of a day for a typical family.

Figure 20:
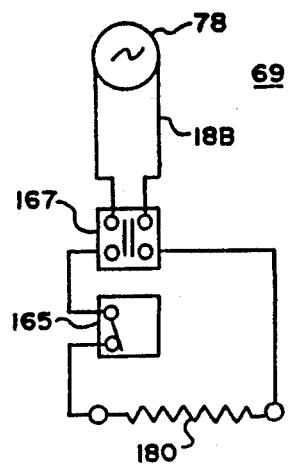
FIG. 20 is a schematic diagram of a secondary heating circuit useful in the embodiment of FIG. 18.

If there is a disproportionate amount of distilled water used as compared to hot water in a particular household in the embodiment of FIG. 18, the level sensor 110 signals when a minimum level has been reached in the distilled water holding system 52. Should the thermostat 160A (FIGS. 18 and 19) be open because hot water temperatures are at or above set point, energy control circuitry 68 (FIGS. 2 and 19) opens valve 181 in a drain conduit forming part of the hot water supply system 46 (FIG. 2). In that case, heated water is dumped to the drain until such time as cold water entering the hot water tank 59 causes thermostat 160A to close and the evaporator tank heating element 98 (FIG. 4) to become energized. The top heating element 180 (FIG. 18) is controlled independently as shown in FIG. 20. It is included to speed recovery from an excessive draw down of hot water.

When hot water is drawn from the hot water heater 234 (FIG. 21) through the conduit 44A, water is forced by pressure in a normal manner from the preheat tank 232 through the conduit 236 to a lower location through the downspout 239. This is true whether the tank is an electrical water heater, a gas water heater or an oil water heater or any other type.

As the water flows out of the preheat tank 232, cold water flows into it through the conduit 22A to a lower location adjacent to a thermostat 160 (FIG. 21) and the condensing element 50. If the cold water lowers the thermostat below its preset value, nothing will happen unless the level within the distilled water holding system 52 falls, or has fallen, below the predetermined start level as measured by level sensors 110.

When the level sensors 110 senses a low level of distilled water and the thermostat 160 closes indicating a cold temperature at the bottom of the preheat tank 232, the energy controller circuitry 68 (FIG. 2) causes the evaporator tank heating element 98 (FIG. 5) of the steam generator 72 (FIG. 2) to be energized and thus to supply heat to the preheat tank 232 and to supply distilled water to the holding tank.

If large amounts of hot water are used but distilled water is not consumed, the preheat tank 232 may not contribute to energy saving within the hot water heater 234 but on the other hand, the source of heating for the hot water heater 234 may be selected for purposes of maximum economy. Similarly, if large amounts of distilled water are consumed but no hot water is used, the distilled water may run out. This is most unlikely as under normal domestic usage, demand for hot water exceeds that which can be generated by the demand for distilled water.

The embodiment of FIG. 22 is intended for use in cabins, recreational vehicles and the like. Steam generator 72A is manually filled to within 1½ inches of the top with feed water. The hot water heater 59 can be either pressurized as for conventional domestic water heaters or non-pressurized in which case water is manually added to a desired level as observed with an external sight gauge.

Distillation is initiated by closing momentary switch 167 (FIG. 23) and continues until either timer 169 times out and shuts power off or by thermostat 160 opening because the desired hot water temperature has been reached. Timer 169 is sized so that distillation stops before the level of water drops to where the heating element 98 will suffer by overheating. Distillation will not restart until the momentary switch 167 is again depressed. With simple modification, steam generator 72A can be gas fired instead of being electrically powered.

In all of the embodiments with the exception of the cabin/recreational vehicle version, the drain solenoid is opened automatically so that the evaporator is drained regularly. When it is turned on, if fluid is below the position sensor, the water solenoid and the feed pump are automatically started and the heater is turned off until water rises above the position sensor 100 (FIG. 5). With this arrangement, scaling on the inside of the steam generator is reduced so as to reduce maintenance and prolong the life of the equipment.

In each of the embodiments, a surprising synergism was found: (1) in the need for the placing of an energy source to give the required heating performance of a hot water heater; (2) in the requirements for the efficient condensation of steam using a condenser in a static tank of water; (3) in the quantity of hot water produced to the amount of distillate; and (4) in the amount of hot water used in a domestic situation compared with the amount of water consumed. The energy needs for producing hot water in a domestic situation are greater than the energy needs for meeting the demand for distilled water for drinking, cooking and the like. Hence, the potential exists to usefully deploy all the energy that can be recovered during condensing and cooling towards meeting the hot water demand. Without this synergism, it is doubtful that many of embodiments for using the heat of condensation for drinking water to obtain hot water would be practical.

From the above description, it can be understood that the embodiments of the invention have several advantages. Each of them has several advantages such as: (1) they save energy by using energy of a still to provide hot water so with less energy, providing distilled water as well as hot water; (2) having an economically constructed condenser which may fit into a water tank, including existing water tanks, by extending through a relatively small opening and yet operate efficiently to generate both hot undistilled and distilled water; (3) they utilize a condenser coil with substantial surface length with convection between them because of proper spacing; (4) they reduce scaling in the evaporator tank by automatically changing water; and (5) the condenser can be easily removed for cleaning should the exterior scale up due to minerals in the undistilled water.

One of the embodiments has a special advantage in that it is able to continuously supply sufficient hot water and yet sufficient distilled water with minimum cost by combining the upper heating element of standard water heaters with a combined condenser and electric element near the bottom and thermostatic control adequate to energize in an efficient manner all heating elements. This embodiment is also relatively small in size and readily adapted to retrofitting with existing equipment.

Other embodiments have particular economy in that they may utilize the best and lowest cost fuel for the water tank and yet save money in preparing distilled water. Thus, they are readily adaptable to different localities with different costs of fuel. In all cases, they are relatively compact, easy to install and overall low in cost.

Although an embodiment of the invention has been described with come particularly, many modifications and variations in the preferred embodiment are possible in the light of the above teachings. Therefore, it is to be understood that, within the scope of the appending claims, the invention may be practiced other than as specifically described.

What is claimed is:

1. A water heating and distillation apparatus comprising:
   a water heating tank including means for admitting feed water to said tank;
   a water distillation unit including steam generating means for converting water into steam and a condenser connected with said steam generating means for condensing steam produced by said steam generating means into distilled water; and
   said condenser including an elongated heat transfer surface positioned substantially entirely within a bottom portion of said tank and oriented substantially horizontally to enhance heat exchange between the steam in said condenser and water in the tank and to promote convective circulation of water in the tank.

2. The apparatus in claim 1 including means defining an opening in said tank and said condenser being configured to pass through said opening for easy insertion of said condenser into the interior of said tank.

3. The apparatus in claim 2 in which said tank is a conventional water heater tank such that said opening is configured to receive an electric heater.

4. The apparatus in claim 2 in which said condenser includes a flange configured to sealingly close said opening and a continuous tube penetrating said flange and formed in a pair of spaced loops in the interior of said tank.

5. The apparatus in claim 4 further including a resistance heater mounted to said flange with said condenser, the assembly of said condenser and heater configured to pass through said opening for easy insertion of said condenser and heater into the interior of said tank.

6. The apparatus in claim 5 further including a thermostat mounted to a wall of said tank and an insulating sleeve internal to a portion of said condenser that penetrates said flange.

7. The apparatus in claim 4 in which each of said loops includes first and second parallel connected portions, said first portions extending from said flange to distal ends and said second portions extending from said distal ends toward said flange.

8. The apparatus in claim 7 in which said condenser further includes a connection portion extending between said loops.

9. The apparatus in claim 8 in which said loop parallel portions are horizontally oriented in each loop and in which said first parallel portions are vertically aligned and said second parallel portions are vertically aligned.

10. The apparatus in claim 1 in which said tank is a conventional water heater tank having a wall and means defining an opening in said wall such that said opening is configured to receive an electric heater and in which said condenser is a looped elongated tube extending through said opening into the interior of said tank.

11. The apparatus in claim 10 in which said tube includes an inlet and an outlet and in which said outlet includes a horizontally extending portion having a vertically offset portion forming a weir to increase transit time of condensate in the condenser.

12. The apparatus in claim 1 in which said tank is a conventional water heater tank having a wall and means defining an opening in said wall such that said opening is configured to receive an electric heater and further in which said condenser includes a flange configured to sealingly engage said opening and an elongated tubular portion extending from said flange to the interior of said tank.

13. The apparatus in claim 12 further including an electric resistance heater mounted to said flange adjacent said tubular portion.

14. The apparatus in claim 13 in which said tubular portion is formed in spaced loops, each of said loops having first and second parallel interconnecting portions, said first portions extending from said flange to distal ends and said second portions extending from said distal ends toward said flange, and further in which said electric heater includes a pair of substantially straight portions axially aligned with said second portions of said condenser tube.

15. The apparatus in claim 13 further including a thermostat mounted to said wall and an insulating sleeve internal said tubular portion adjacent said flange.

16. The apparatus in claim 1 further including a means for providing an outlet of said tank connected with a conventional water heater, whereby the heat released by said condenser will heat the feed water of the water heater and the need for control interface between said water heater and said distillation unit is substantially avoided.

17. The apparatus in claim 1 further including a holding tank operatively connected with said condenser for storing distilled water condensed in said condenser, level monitoring means for monitoring the level of water in said holding tank, temperature monitoring means for monitoring the temperature of water in said tank and means responsive to said level and temperature monitoring means for applying power to said steam generator when said level is below a predetermined level provided that said temperature is below a predetermined value.

* * * * *